(12) United States Patent
Kondrad et al.

(10) Patent No.: US 10,821,929 B2
(45) Date of Patent: Nov. 3, 2020

(54) SEAT ASSEMBLY WITH FULL SEATBACK AIRBAG

(71) Applicant: Ford Global Technologies, LLC, Dearborn, MI (US)

(72) Inventors: Marcos Silva Kondrad, Macomb Township, MI (US); Johnathan Andrew Line, Northville, MI (US); Alan George Dry, Grosse Pointe Woods, MI (US); S. M. Akbar Berry, Windsor (CA); Derek Board, Ferndale, MI (US); Srinivasan Sundararajan, Ann Arbor, MI (US); Spencer Robert Hoernke, Dundas (CA)

(73) Assignee: Ford Global Technologies, LLC, Dearborn, MI (US)

( * ) Notice: Subject to any disclaimer, the term of this patent is extended or adjusted under 35 U.S.C. 154(b) by 70 days.

(21) Appl. No.: 16/370,519

(22) Filed: Mar. 29, 2019

(65) Prior Publication Data

US 2020/0307488 A1  Oct. 1, 2020

(51) Int. Cl.
*B60R 21/207* (2006.01)
*B60R 21/215* (2011.01)
*B60R 21/231* (2011.01)
*B60N 2/68* (2006.01)

(52) U.S. Cl.
CPC .............. *B60R 21/207* (2013.01); *B60N 2/68* (2013.01); *B60R 21/215* (2013.01); *B60R 21/23184* (2013.01); *B60N 2205/30* (2013.01); *B60R 2021/23146* (2013.01)

(58) Field of Classification Search
None
See application file for complete search history.

(56) References Cited

U.S. PATENT DOCUMENTS

| 5,330,255 | A | 7/1994 | Stawicki |
| 5,586,782 | A | 12/1996 | Zimmerman, II et al. |
| 5,816,610 | A | 10/1998 | Higashiura et al. |
| 5,911,434 | A | 6/1999 | Townsend |
| 6,302,431 | B1 | 10/2001 | Sasaki et al. |

(Continued)

FOREIGN PATENT DOCUMENTS

DE     102009040641 A1    4/2010

*Primary Examiner* — Drew J Brown
(74) *Attorney, Agent, or Firm* — David Coppiellie; Price Heneveld LLP

(57) ABSTRACT

A seatback carrier module includes first and second side portions spaced-apart from one another and interconnected by an upper portion. A cradle portion is disposed along the first and second side portions and the upper portion of the seatback carrier module. The cradle portion includes inner and outer edges with a rearwardly extending body portion. A mounting portion is disposed along a portion of the inner edge of the cradle portion. The mounting portion includes inner and outer edges with a body portion disposed therebetween. The mounting portion further includes a rearwardly extending sidewall disposed along the inner edge of the mounting portion. An airbag assembly is received within the cradle portion and has an inverted U-shaped configuration to substantially surround the outer perimeter of the seatback frame. The airbag assembly is an elongate member defining an overhead airbag assembly.

20 Claims, 15 Drawing Sheets

(56) References Cited

U.S. PATENT DOCUMENTS

| | | | |
|---|---|---|---|
| 7,021,654 B2 | 4/2006 | Honda et al. | |
| 7,695,064 B2 | 4/2010 | Thomas et al. | |
| 8,596,675 B2 | 12/2013 | Kwon et al. | |
| 9,039,035 B1 | 5/2015 | Faruque et al. | |
| 2009/0206584 A1 | 8/2009 | Bauer et al. | |
| 2012/0306251 A1* | 12/2012 | Arefi | B60N 2/68 297/354.1 |
| 2013/0320742 A1* | 12/2013 | Murolo | B60N 2/682 297/452.18 |
| 2015/0108744 A1 | 4/2015 | Line et al. | |
| 2015/0246627 A1* | 9/2015 | Shimizu | B60N 2/665 297/216.14 |
| 2018/0009353 A1* | 1/2018 | Yokoyama | B60N 2/20 |
| 2018/0222357 A1* | 8/2018 | Mochizuki | B60N 2/682 |
| 2019/0225180 A1* | 7/2019 | Kondrad | B60R 21/207 |
| 2020/0114858 A1* | 4/2020 | Henriksson | B60R 21/235 |

\* cited by examiner

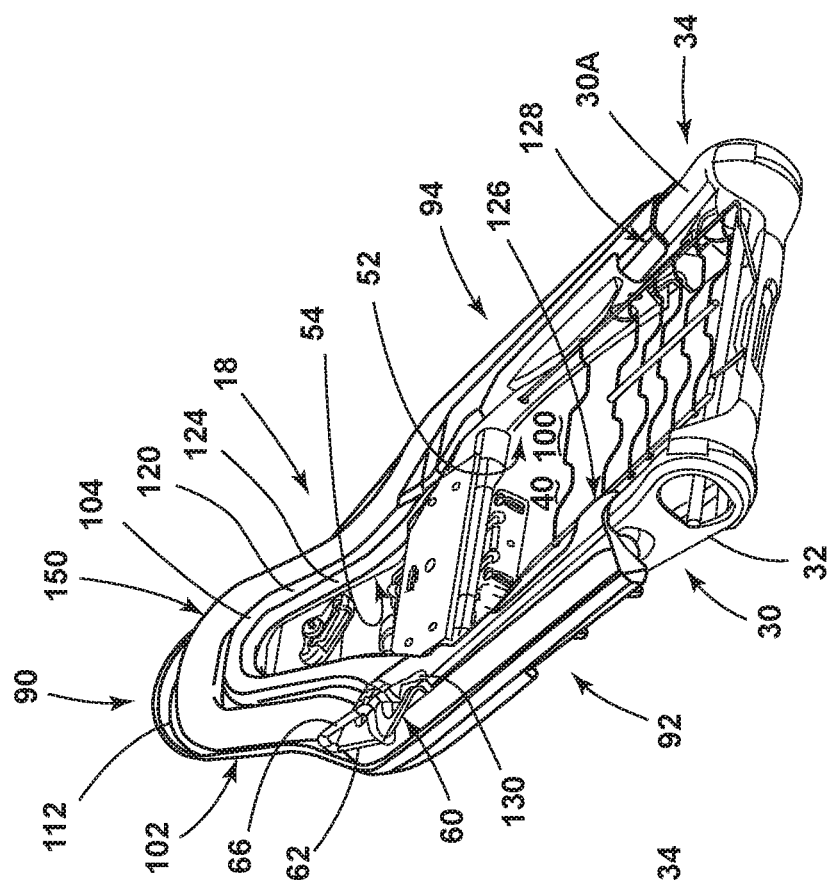
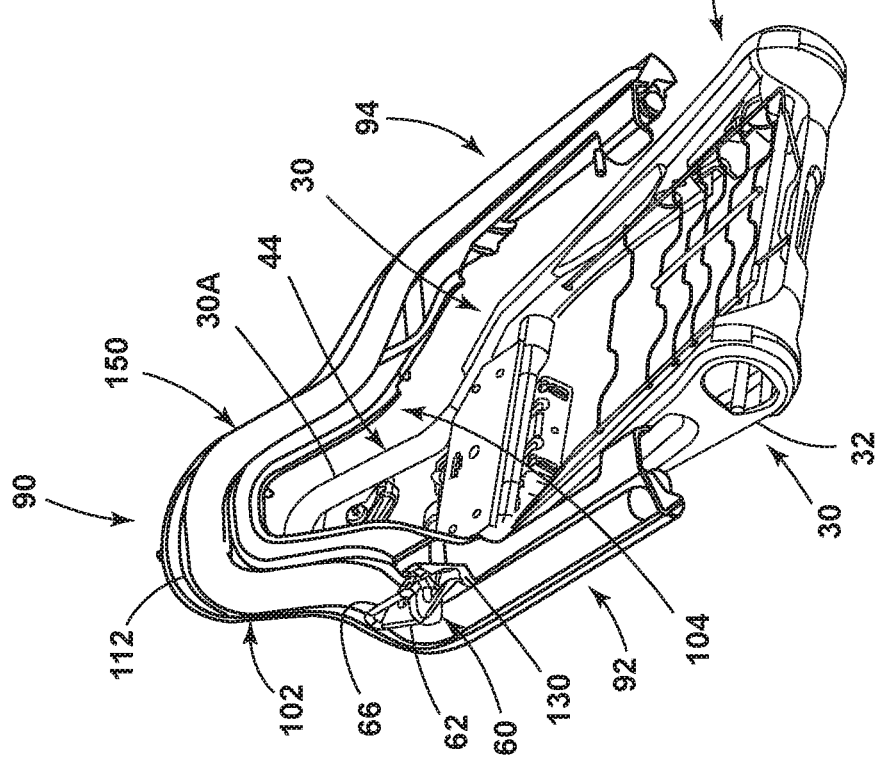
FIG. 7C
FIG. 7B

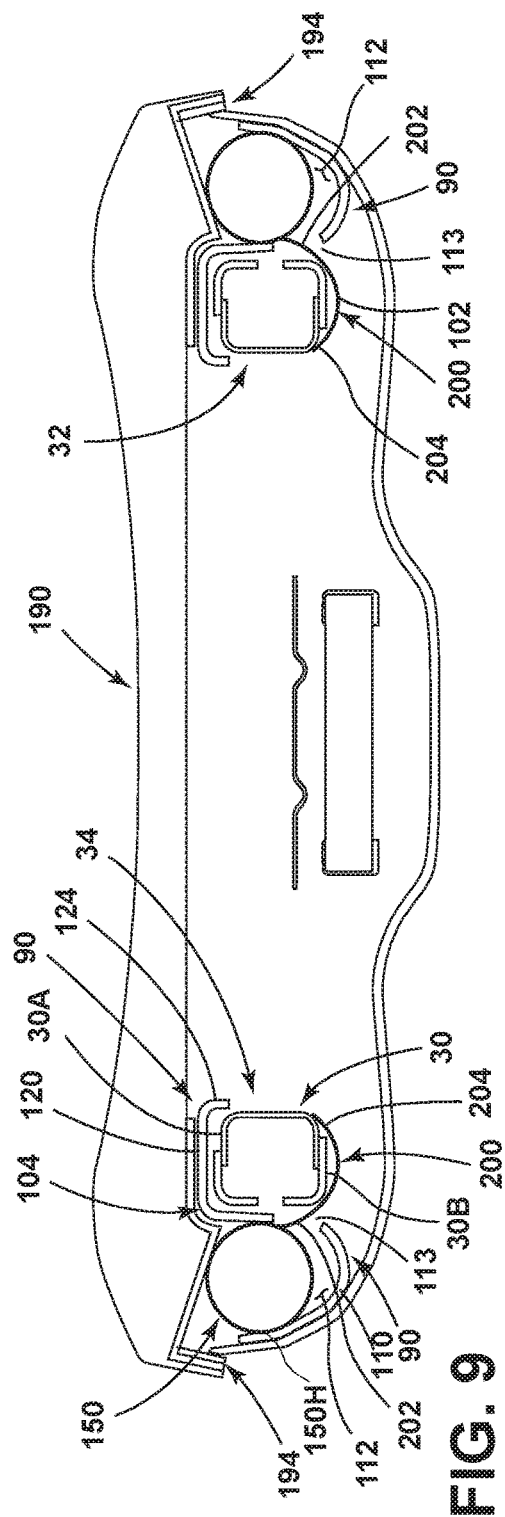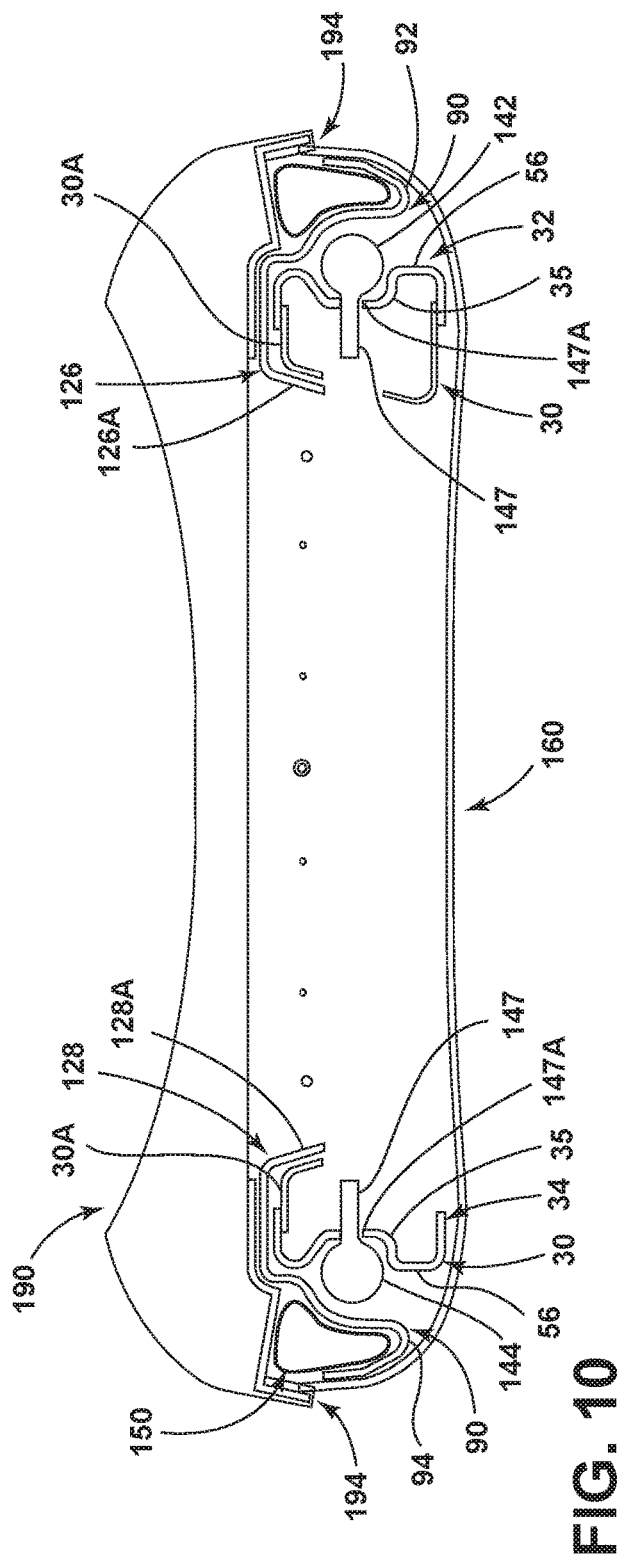

SEAT ASSEMBLY WITH FULL SEATBACK AIRBAG

FIELD OF THE INVENTION

The present invention generally relates to a seat assembly, and more particularly, to a seat assembly having an integrated seatback carrier supporting an airbag system for deploying a full seat airbag.

BACKGROUND OF THE INVENTION

With the growing focus on autonomous or self-driving vehicles, new and flexible interior experiences are sought. With specific regard to seat assemblies, enhancements in occupant protection may be desired. This is particularly the case in seating assemblies for autonomous vehicles which may be operable between various configurations, such as forward and rearward facing orientations. The present concept provides an overhead airbag system for a seatback that packages within a thinner profile for a seat design and provides traditional restraint needs in an unconventional way.

SUMMARY OF THE INVENTION

According to one aspect of the present invention, a seatback carrier module includes first and second side portions spaced-apart from one another and interconnected by an upper portion. A cradle portion is disposed along the first and second side portions and the upper portion of the seatback carrier module. The cradle portion includes inner and outer edges with a rearwardly extending body portion. A mounting portion is disposed along a portion of the inner edge of the cradle portion. The mounting portion includes inner and outer edges with a body portion disposed therebetween. The mounting portion further includes a rearwardly extending sidewall disposed along the inner edge of the mounting portion. An airbag assembly is received within the cradle portion.

According to another aspect of the present invention, a seatback carrier module includes a mounting portion having inner and outer edges with a body portion disposed therebetween. The mounting portion further includes a rearwardly extending sidewall disposed along the inner edge of the mounting portion. A cradle portion is disposed along and surrounds the outer edge of the mounting portion. The cradle portion includes an outwardly opening raceway having first and second ends with an upwardly curved body portion disposed between the first and second ends. An airbag assembly is received within the outwardly opening raceway of the cradle portion for outward deployment therefrom.

According to yet another aspect of the present invention, a seatback assembly includes a seatback frame having first and second side members defining a back support portion of the seatback frame. An upper frame member interconnects the first and second side members of the seatback frame to define a headrest support portion of the seatback frame. The upper frame member extends upwardly from the back support portion of the seatback frame. The seatback frame includes an outer perimeter disposed around the first and second side members and the upper frame member. A seatback carrier module is operably coupled to the seatback frame and includes a cradle portion outwardly extending from the outer perimeter of the seatback frame. An airbag assembly is supported by the seatback carrier module. The airbag assembly is disposed on opposed sides of the back support portion of the seatback frame and is further disposed over the headrest support portion of the seatback frame.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIGS. 7A-7C are top perspective views of the seatback carrier module of FIG. 5B being mounted to the seatback frame of FIG. 3;

FIG. 9 is a cross-sectional view of the seatback assembly of FIG. 8 taken at line IX;

FIG. 10 is a cross-sectional view of the seatback assembly of FIG. 8 taken at line X;

DETAILED DESCRIPTION OF THE PREFERRED EMBODIMENTS

Figure 1:
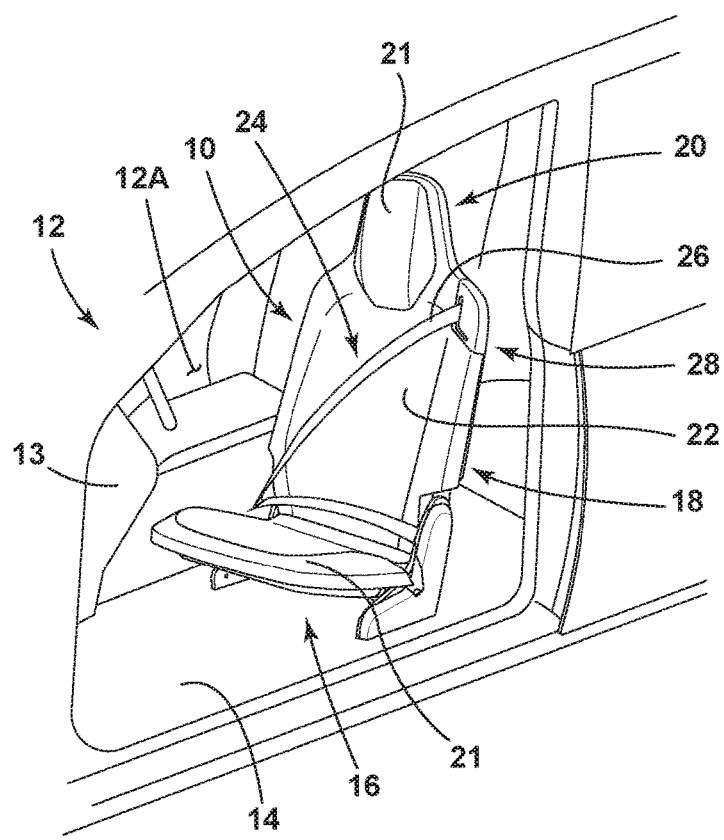
FIG. 1 is a front perspective view of a seat assembly disposed within a vehicle interior.

For purposes of description herein, the terms "upper," "lower," "right," "left," "rear," "front," "vertical," "horizontal," and derivatives thereof shall relate to the seat assembly as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring now to FIG. 1, a seat assembly 10 is shown disposed within an interior 12A of a vehicle 12. Specifically, the seat assembly 10 is disposed within the vehicle interior 12A adjacent to an instrument panel or dashboard 13. In FIG. 1, the seat assembly 10 is positioned in a driver's side seating area. However, it is contemplated that the seat assembly 10, or various components and features thereof, can be disposed on other seat assemblies positioned in other areas of a vehicle interior 12A, such as the passenger side seating area, a rear seating area, or a third row seating option for example. The seat assembly 10 is shown in FIG. 1 as being supported on a vehicle floor support surface 14 and generally includes a substantially horizontal seat portion 16 and a substantially upright seatback assembly 18. It is contemplated that the seat assembly 10 may also be supported on a track system for providing fore and aft movement within the vehicle interior 12A. It is contemplated that the seatback assembly 18 may be a pivoting member configured for reclining movement relative to the seat portion 16. It is further contemplated that the seat assembly 10 may rotate within the vehicle interior between forward-facing and rearward-facing orientations. As such, it is contemplated that the vehicle 12 may be an autonomous or self-driving vehicle, in which a seat assembly having forward-facing and rearward-facing capabilities may be disposed.

Figure 2:
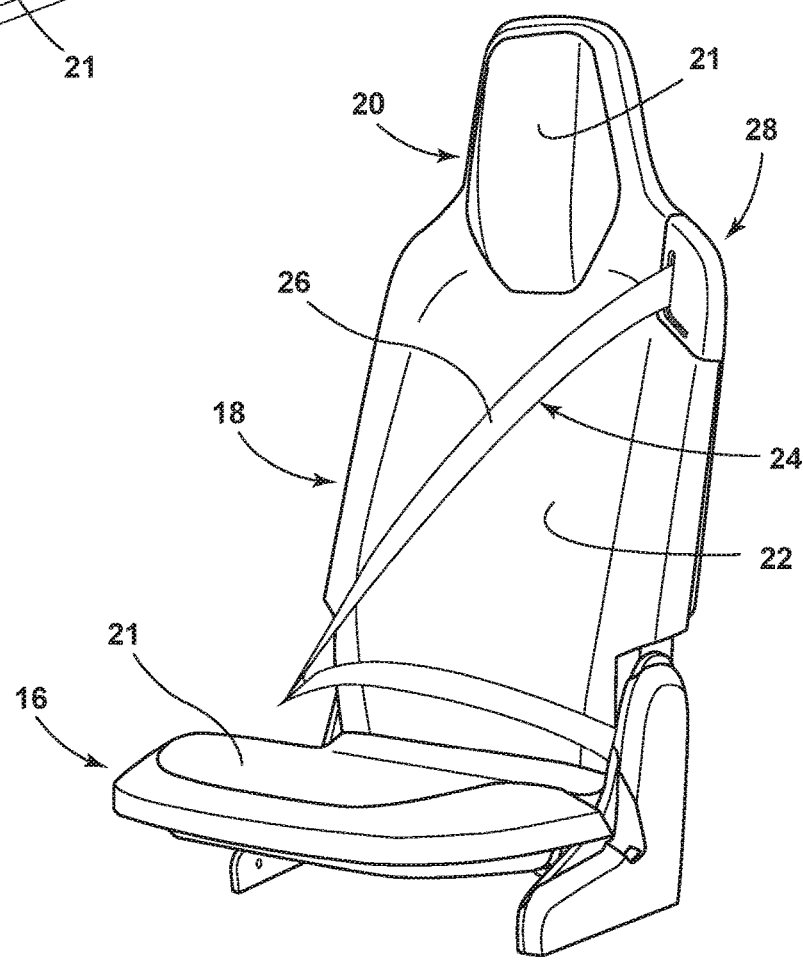
FIG. 2 is a front perspective view of the seat assembly of FIG. 1 as removed from the vehicle interior.

As shown in FIGS. 1 and 2, a headrest assembly 20 is disposed on an upper portion of the seatback assembly 18 and includes a forwardly extending headrest bun 21. The headrest assembly 20 and the seatback assembly 18 may be integrated components or modular components coupled to one another. As further shown in FIG. 1, the various parts of the seat portion 16 and the seatback assembly 18 are covered with seat covers 21, 22, respectively. With specific regard to the seat cover 22 of the seatback assembly 18, the seat cover 22 is contemplated to include various support materials, such as cloth and foam materials packaged as an exterior comfort carrier module, that are used to cover various frame materials supporting the seat assembly 10, as well as cover other components of the seat assembly 10, as further described below.

As further shown in FIGS. 1 and 2, the seat assembly 10 includes a restraint system 24 having a seatbelt 26 with a belt guide 28 disposed at a shoulder height location along the seatback assembly 18. The restraint system 24 of the present concept provides a seat occupant with a familiar restraining system using the seatbelt 26. However, the restraint system 24 is fully integrated into the seat assembly 10, such that the restraint system 24 does not require support or attachment features positioned within the vehicle interior 12A outside of the seat assembly 12, such as a standard B-column belt attachment location. In this way, the seat assembly 10 can alternate between forward-facing and rearward-facing configurations while still providing a consistent mechanism for passenger restraint in the integrated restraint system 24.

Figure 3:
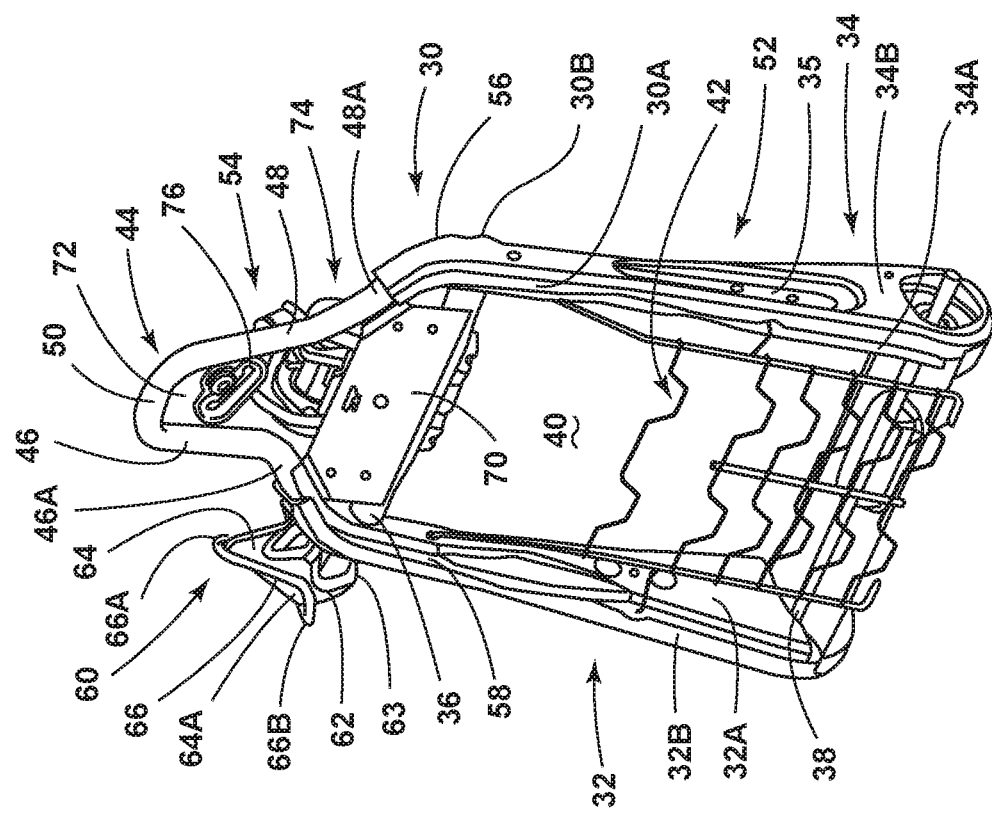
FIG. 3 is a front perspective view of a seatback frame.

Referring now to FIG. 3, a seatback frame 30 is shown having a generally inverted U-shaped configuration with a front side 30A and a rear side 30B. The seatback frame 30 includes first and second side members 32, 34 which are generally disposed in an upright orientation and spaced-apart from one another. Upper and lower cross members 36, 38 interconnect the first and second side members 32, 34 of the seatback frame 30 to define a generally centrally disposed window 40 therebetween. Within the centrally disposed window 40, a suspension system 42 is disposed interconnecting the first and second side members 32, 34. The first and second side members 32, 34 each comprise inner and outer frame members 32A, 34A and 32B, 34B, respectively. The outer frame members 32B, 34B each include inset portions 35 which inwardly extend laterally into the first and second side members 32, 34. The first and second side members 32, 34 are contemplated to be mirror images of one another, such that the description of one side member also describes the other side member in a mirrored configuration. Together, the first and second side members 32, 34 define a back support portion 52 of the seatback frame 30.

As further shown in FIG. 3, an upper frame member 44 includes first and second side portions 46, 48 that interconnect with the first and second side members 32, 34 of the seatback frame 30. Specifically, the first and second side portions 46, 48 of the upper frame member 44 include opposing ends 46A, 48A, respectively, which interconnect with upper portions of the first and second side members 32, 34 of the seatback frame 30. The upper frame member 44 further includes an upper portion 50 which interconnects the first and second side portions 46, 48 to define a headrest support portion 54 of the seatback frame 30. Thus, the first and second side portions 46, 48 upwardly extend from the first and second side members 32, 34, of the seatback frame 30, and then interconnect at upper portion 50 to generally define an overall inverted U-shaped configuration for the upper frame member 44. It is contemplated that the upper frame member 44 may be a unitary member interconnecting the upper portions of the first and second side members 32, 34 of the seatback frame 30.

As further shown in FIG. 3, the headrest support portion 54 of the seatback frame 30 is disposed above the back support portion 52 of the seatback frame 30. Collectively, the first and second side members 32, 34 and the upper frame member 44 cooperate to define an outer perimeter 56 of the seatback frame 30. The outer perimeter 56 of the seatback frame 30 extends around the first side member 32, around and over the upper frame member 44, and around the second side member 34 in a generally inverted U-shaped configuration. Further, the seatback frame 30 also includes an inner edge 58 which is defined by inner portions of the first and second side members 32, 34 and the upper frame member 44. As used herein, the term "inverted U-shaped configuration" is used to describe a structural configuration in which two parallel or substantially parallel side members are interconnected at upper portions thereof by an interconnecting member. The interconnecting member can be a straight member or an upwardly curved member (or portion of a unitary member) that interconnects the side members. A component of the present disclosure described herein as having an inverted U-shaped configuration or a generally/substantially inverted U-shaped configuration may be comprised of multiple components to define an overall inverted U-shaped configuration, or may be a unitary monolithic part disposed in an inverted U-shaped configuration.

With further reference to FIG. 3, the seatback frame 30 includes a seatbelt retainer 60 having a mounting bracket 62 which is coupled to the first side member 32 of the seatback frame 30 in the embodiment shown in FIG. 3. Specifically, the mounting bracket 62 is coupled to the outer frame member 32B of the first side member 32 at a mounting portion 63 of the mounting bracket 62. The mounting bracket 62 further includes a plate portion 64 which outwardly extends from the mounting portion 63, such that, in an overall sense, the mounting bracket 62 outwardly extends from the outer perimeter 56 of the seatback frame 30 at the first side member 32 thereof. The plate portion 64 of the mounting bracket 62 supports a retaining bar 66 thereon. The retaining bar 66 is shown in FIG. 3 in the form of a bar or tube that is outwardly extending in a forward manner from a front side 64A of the plate portion 64 of the mounting bracket 62. The retaining bar 66 includes first and second ends 66A, 66B which are coupled to the plate portion 64 of the mounting bracket 62, such that a portion of the retaining bar 66 is spaced-apart from the plate portion 64 of the mounting bracket 62 for receiving a seatbelt and guiding the same therethrough and around the retaining bar 66. In use, the seatbelt retainer 60 is configured to route a seatbelt of a seatbelt mechanism around a seat occupant, in a manner shown with respect to the seatbelt 26 illustrated in FIG. 1. In the embodiment of FIG. 3, the seatbelt retainer 60 is shown disposed on the first side member 32 of the seatback frame 30, however, it is also contemplated that the seatbelt retainer 60 may be disposed on the second side member 34 of the seatback frame 30 to provide a seat assembly configured much like the seat assembly 10 shown in FIGS. 1 and 2. As such, it is contemplated that the seatback frame 30 shown in FIG. 3 may be used as a passenger side seat assembly to provide for a crossing seatbelt configuration similar to a standard seatbelt configuration found in a car having non-rotating seat assemblies.

As further shown in FIG. 3, a mounting plate 70 is coupled to the upper cross member 36 of the seatback frame 30, and is further coupled to the upper frame member 44. The mounting plate 70 is provided add structural support to the seatback frame 30 and to support components of the seat assembly 10, such as a seatbelt retractor mechanism 74. Another mounting plate 72 is shown disposed above mounting plate 70 on the upper frame member 44 between the first and second side portions 46, 48 thereof. In the embodiment shown in FIG. 3, the mounting plate 72 includes a retaining bar 76 mounted thereto which may be used to guide a seatbelt through the seat assembly 10, such as seatbelt 26 shown in FIGS. 1 and 2.

Figure 4B:
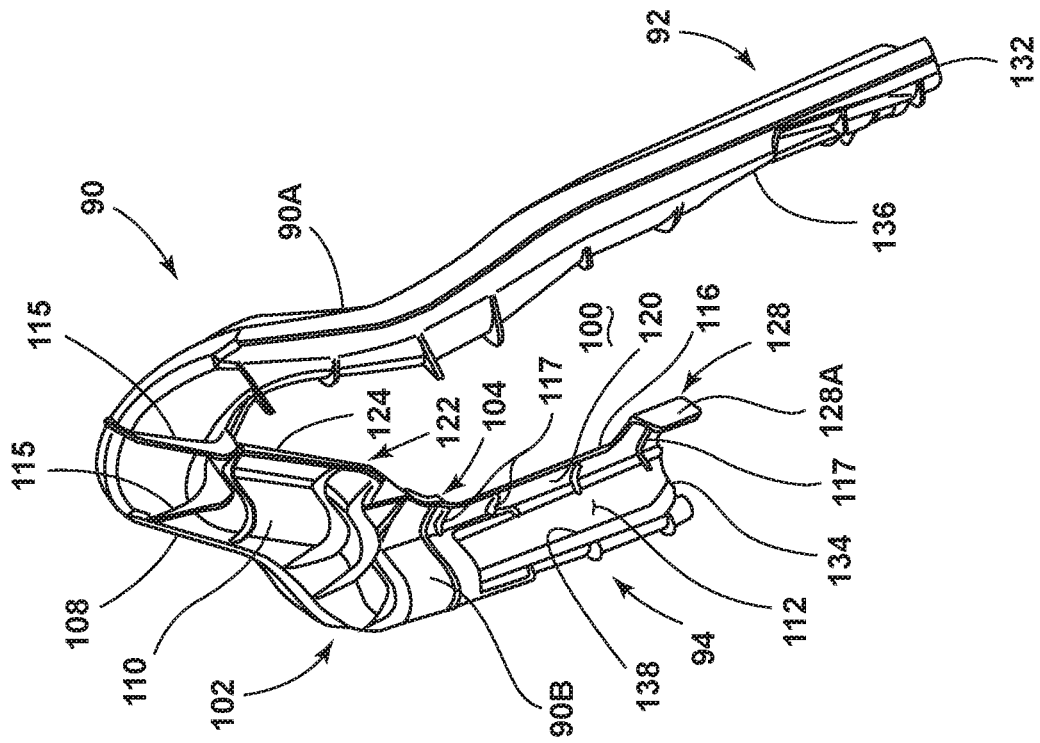
FIG. 4B is a rear perspective view of the seatback carrier module of FIG. 4A.
Figure 4A:
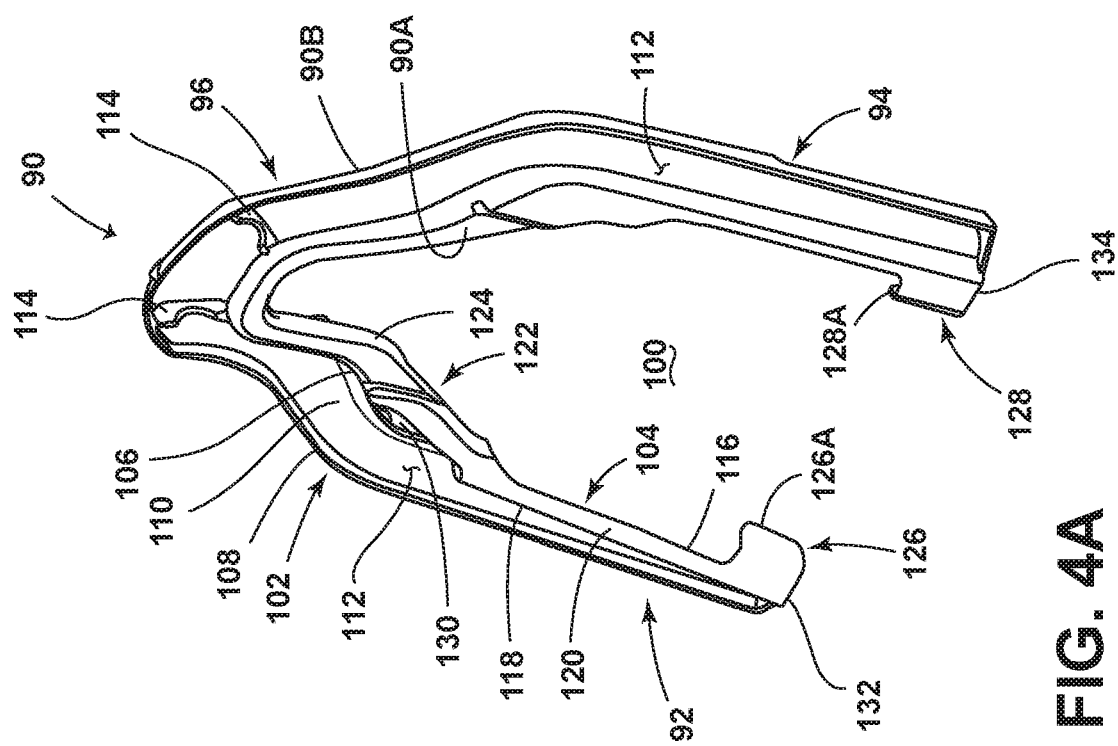
FIG. 4A is a front perspective view of a seatback carrier module.

Referring now to FIG. 4A, a seatback carrier module 90 is shown having a generally inverted U-shaped configuration. The seatback carrier module 90 includes a front side 90A and rear side 90B. The seatback carrier module 90 includes first and second side members 92, 94 which are generally disposed in an upright orientation and spaced-apart from one another. The seatback carrier module 90 further includes an upper cross member 96 that extends upwardly from and interconnects the first and second side members 92, 94 of the seatback carrier module 90 to define a generally centrally disposed window 100 therebetween. In assembly, the centrally disposed window 40 of the seatback frame 30 is configured to align with the centrally disposed window 100 defined by the seatback carrier module 90. As further described below, the first and second side members 92, 94 of the seatback carrier module 90 are disposed adjacent to the back support portion 52 of the seatback frame 30 in assembly.

It is contemplated that the seatback carrier module 90 is a unitary member, wherein the upper cross member 96 and the first and second side members 92, 94 of the seatback carrier module 90 are formed as a monolithic carrier member. It is further contemplated that the seatback carrier module 90 may be comprised of a polymeric material formed in a suitable injection molding process.

As further shown in FIG. 4A, the seatback carrier module 90 includes a cradle portion 102 and a mounting portion 104. The cradle portion 102 includes an inner edge 106 and an outer edge 108 with a rearwardly extending body portion 110 disposed therebetween. It is contemplated that the rearwardly extending body portion 110 may be a curved rearwardly extending body portion which defines a forwardly opening raceway 112 of the cradle portion 102. The raceway 112 of the cradle portion 102 may include a C-shaped cross-section for receiving and supporting an airbag assembly, as further described below. As shown in FIG. 4A, the cradle portion 102 of the seatback carrier module 90 may include a number of reinforcement struts 114 which span a width of the raceway 112 between the inner and outer edges 106, 108. In use, the reinforcement struts 114 provide structural stability to the cradle portion 102 of the seatback carrier module 90.

As further shown in FIG. 4A, the mounting portion 104 of the seatback carrier module 90 is disposed inboard of the cradle portion 102 of the seatback carrier module 90. Otherwise stated, the cradle portion 102 of the seatback carrier module 90 is disposed outboard of the mounting portion 104 of the seatback carrier module 90. In this way, the cradle portion 102 of the seatback carrier module 90 is outwardly disposed relative to the mounting portion 104, such that the cradle portion 102 of the seatback carrier module 90 outwardly surrounds the mounting portion 104 of the seatback carrier module 90. In the embodiment shown in FIG. 4A, the mounting portion 104 of the seatback carrier module 90 includes an inner edge 116 and an outer edge 118 with a body portion 120 disposed therebetween. It is contemplated that the outer edge 118 of the mounting portion 104 may also define the inner edge 106 of the cradle portion 102 of the seatback carrier module 90. The mounting portion 104 further includes an upper engagement member 122 having a rearwardly extending sidewall 124 which extends rearwardly from the inner edge 116 of the mounting portion 104. In use, the rearwardly extending sidewall 124 is configured to cooperate with the body portion 120 of the mounting portion 104 to define an L-shaped cross-section which wraps around the inner edge 58 of the seatback frame 30 at the upper frame member 44 of the seatback frame 30, as further described below. Similarly, the mounting portion 104 further includes lower engagement members 126, 128 which are disposed on the first and second side members 92, 94 respectively. As specifically shown in FIG. 4A, the lower engagement members 126, 128 are disposed adjacent to lowermost portions of the first and second side members 92, 94 and include rearwardly extending sidewalls 126A, 128A, respectively. In use, the rearwardly extending sidewalls 126A, 128A are configured to cooperate with the body portion 120 to define an L-shaped cross-section which wraps around the inner edge 58 of the seatback frame 30 at lowermost portions of the first and second side members 32, 34 of the seatback frame 30, as further described below. In this way, the mounting portion 104 of the seatback carrier module 90 is configured to securely couple the seatback carrier module 90 to the seatback frame 30.

With further reference to FIG. 4A, the raceway 112 of the seatback carrier module 90 is configured to substantially span an entire length of the cradle portion 102 of the seatback carrier module 90. In this way, the raceway 112 can support an airbag assembly which substantially follows the contours of the seatback carrier module 90 for an entire length or a portion of the length of the raceway 112, as further described below. Thus, the raceway 112 is disposed along the cradle portion 102 of the seatback carrier module 90 between first and second ends 132, 134 of the seatback carrier module 90. As such, the raceway 112 includes an inverted U-shaped configuration. As further shown in FIG. 4A, an access aperture 130 is disposed between the mounting portion 104 and the cradle portion 102 of the seatback carrier module 90. The access aperture 130 is positioned between the mounting portion 104 and the cradle portion 102 of the seatback carrier module 90 to allow the mounting bracket 62 of the seatbelt retainer 60 to extend therethrough when the seatback carrier module 90 is coupled to the seatback frame 30, as further described below.

Referring now to FIG. 4B, the seatback carrier module 90 is shown from a rear perspective view, wherein lower access slots 136, 138 are shown disposed at lower portions of the first and second side members 92, 94 of the seatback carrier module 90, respectively, to provide access to the raceway 112 of the cradle portion 102. The lower access slots 136, 138 are disposed along the rearwardly extending body portion 110 to provide access to the raceway 112 for installing inflator mechanisms for an airbag assembly on the seatback carrier module 90, as well as providing access for connecting features between the seatback carrier module 90 and the seatback frame 30, as further described below. The lower access slots 136, 138 are opposed access slots that open inwardly towards the centrally disposed window 100 defined by the seatback carrier module 90.

In the embodiment shown in FIG. 4B, a plurality of reinforcement ribs 115 are disposed around the cradle portion 102 on the rear side 90B of the seatback carrier module 90 to structurally reinforce the raceway 112 of the cradle portion 102. Specifically, the reinforcement ribs 115 of the seatback carrier module 90 defined rearwardly extending fins projecting from the rear side 90B of the seatback carrier module 90 at the body portion 110 of the cradle portion 102 of the seatback carrier module 90. Similarly, a plurality of reinforcement ribs 117 are disposed around the mounting portion 104 on the rear side 90B of the seatback carrier module 90 to structurally reinforce the mounting portion 104 of the seatback carrier module 90 at the intersection of the body portion 120 of the mounting portion 104 and the rearwardly extending sidewalls 124, 126A and 128A at the respective coupling portions 122, 126 and 128.

Figure 4C:
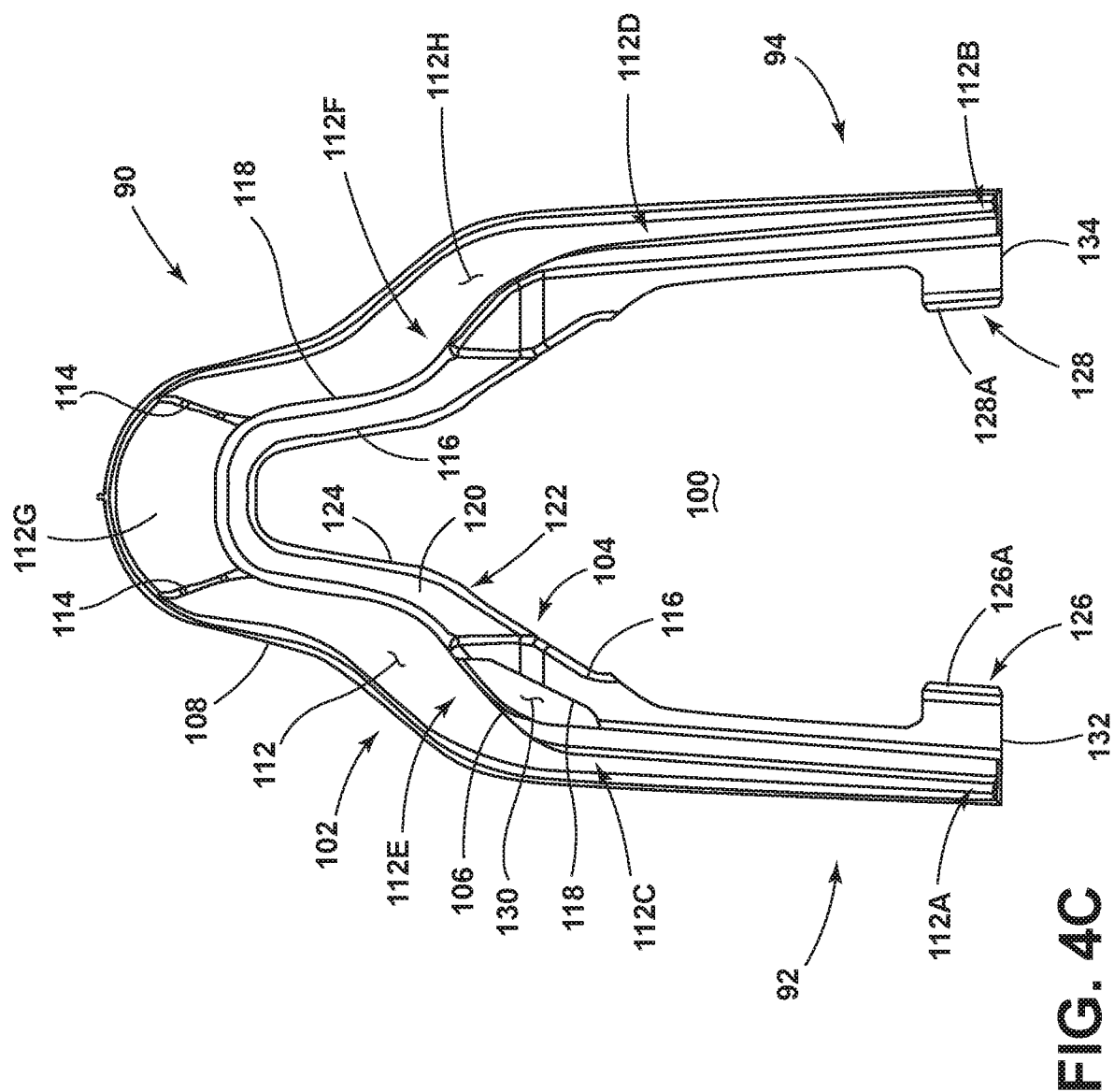
FIG. 4C is a front elevation view of the seatback carrier module of FIG. 4A.

Referring now to FIG. 4C, the seatback carrier module 90 is shown from a front plan view, such that the entire raceway 112 of the cradle portion 102 of the seatback carrier module 90 is visible. As shown in FIG. 4C, the raceway 112 includes first and second ends 112A, 112B disposed at the first and second ends 132, 134 of the seatback carrier module 90. First and second upwardly extending portions 112C, 112D of the raceway 112 extend upwardly from the first and second ends 112A, 112B of the raceway 112, respectively. At a general shoulder height position of the seatback carrier module 90, the raceway 112 includes inwardly extending portions 112E, 112F, which further culminate at an upper transverse portion 112G. Collectively, the portions 112C, 112D, 112E, 112F, and 112G of the raceway 112 disposed between the first and second ends 112A, 112B of the raceway 112 define a body portion 112H of the raceway 112 having an inverted U-shaped configuration. In this way, the body portion 112H of the raceway 112 of the seatback carrier module 90 extends all the way around the seatback carrier module 90 at an outer portion thereof between the first and second ends 132, 134 of the seatback carrier module 90. As further shown in FIG. 4C, the access aperture 130 is shown disposed along the first side member 92 of the seatback carrier module 90 and is positioned between the inner edge 106 of the cradle portion 102 and outer edge 118 of the mounting portion 104 of the seatback carrier module 90. It is contemplated that the access aperture 130 may be disposed along the second side member 94 of the seatback carrier module 90 for a different seat configuration, such as a driver's side seat configuration. In such a configuration, the access aperture 130 would again be positioned between the inner edge 106 of the cradle portion 102 and the outer edge 118 of the mounting portion 104.

Figure 5A:
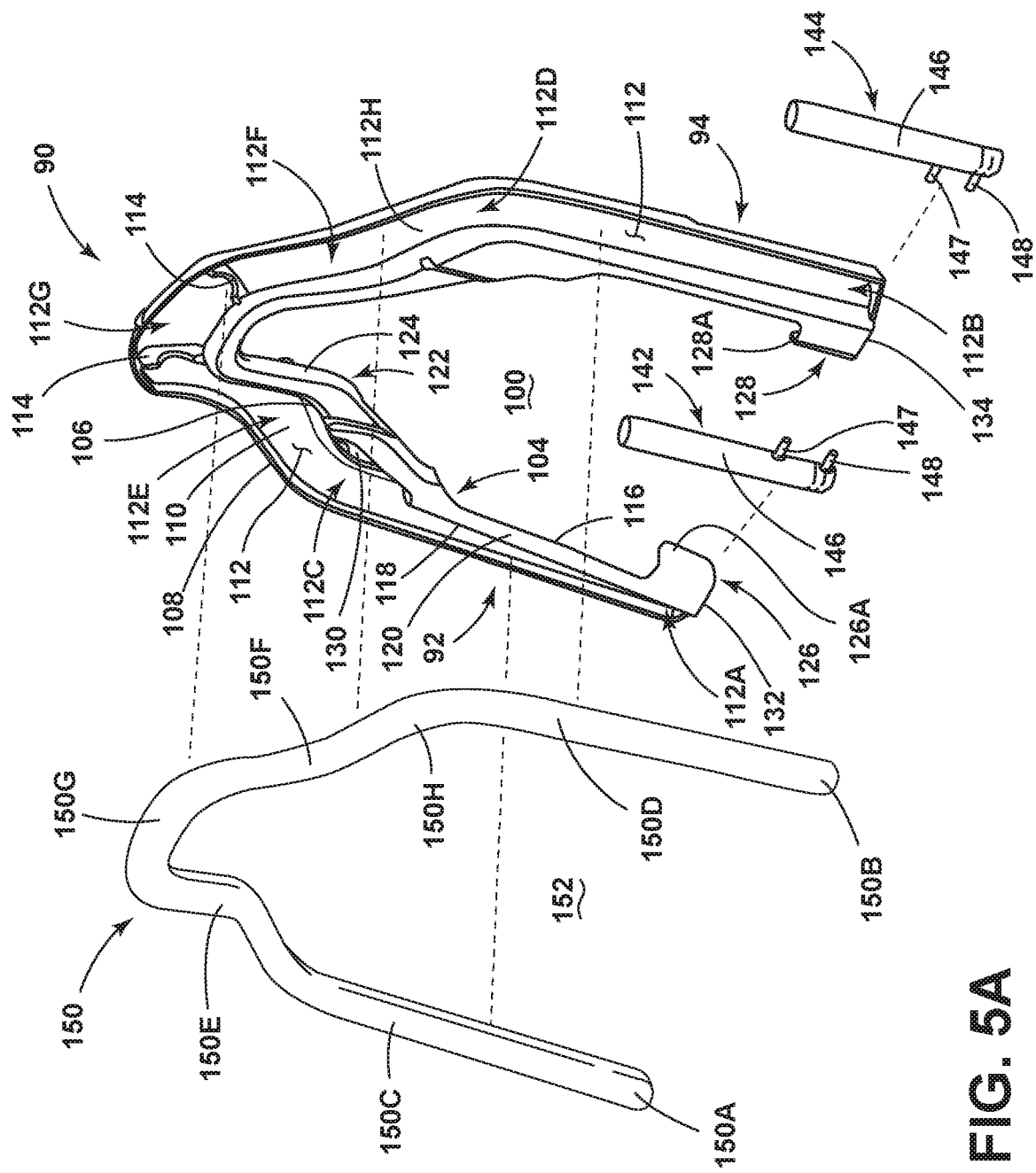
FIG. 5A is a front perspective view of the seatback carrier module of FIG. 4A with an airbag assembly and two inflator mechanisms exploded away therefrom.

Referring now to FIG. 5A, the seatback carrier module 90 is shown from a front perspective view with an airbag assembly 150 and first and second inflator mechanisms 142, 144 exploded away therefrom. The inflator mechanisms 142, 144 each include cylindrical body portions 146 having upper and lower mounting stems 147, 148 which are used to couple the inflator mechanisms 142, 144 to the seatback frame 30, as further described below. The inflator mechanisms 142, 144 may be partially received within the cradle portion 102 of the seatback carrier module 90 along the lower portions 112A, 112B of the raceway 112, such that the first inflator mechanism 142 is positioned on or near the first side member 92 of the seatback carrier module 90, and the second inflator mechanism 144 is positioned on or near the opposing second side member 94 of the seatback carrier module 90. It is further contemplated that the first and second inflator mechanisms 142, 144 are positioned outside of the seatback carrier module 90 adjacent to the first and second lower access slots 136, 138 disposed on the first and second side members 92, 94 of the seatback carrier module 90, respectively. In use, the first and second inflator mechanisms 142, 144 are used to inflate the airbag assembly 150 in response to a detected condition of the seat assembly 10 or the vehicle 12 in which the seat assembly 10 is contemplated to be disposed.

As further shown in FIG. 5A, the airbag assembly 150 includes first and second ends 150A, 150B which further include upwardly extending portions 150C, 150D, respectively. At a general shoulder height position of the airbag assembly 150, the airbag assembly 150 includes inwardly extending portions 150E, 150F, which further culminate at an upper transverse portion 150G. Collectively, the portions 150C, 150D, 150E, 150F, and 150G of the airbag assembly 150 disposed between the first and second ends 150A, 150B define an elongate body portion 150H of the airbag assembly 150, such that the airbag assembly 150 is an elongate member having an inverted U-shaped configuration. In this way, the body portion 150H of the airbag assembly 150 extends all the way around of the seatback carrier module 90 as received in the raceway 112 thereof between the first and second ends 132, 134 of the seatback carrier module 90. It is contemplated that the airbag assembly 150 is a flexible member, such that the body portion 150H of the airbag assembly 150 can be contoured to fit within the raceway 112 of the cradle portion 102 of the seatback carrier module 90, as further described below with reference to FIGS. 5B-5E. Thus, it is contemplated that the inverted U-shaped configuration of the airbag assembly 150 is provided by the airbag assembly 150 being stowed within the raceway 112 of the cradle portion 102 of the seatback carrier module 90, wherein the raceway 112 includes a substantially rigid U-shaped configuration to receive and support the airbag assembly 150.

Figure 5C:
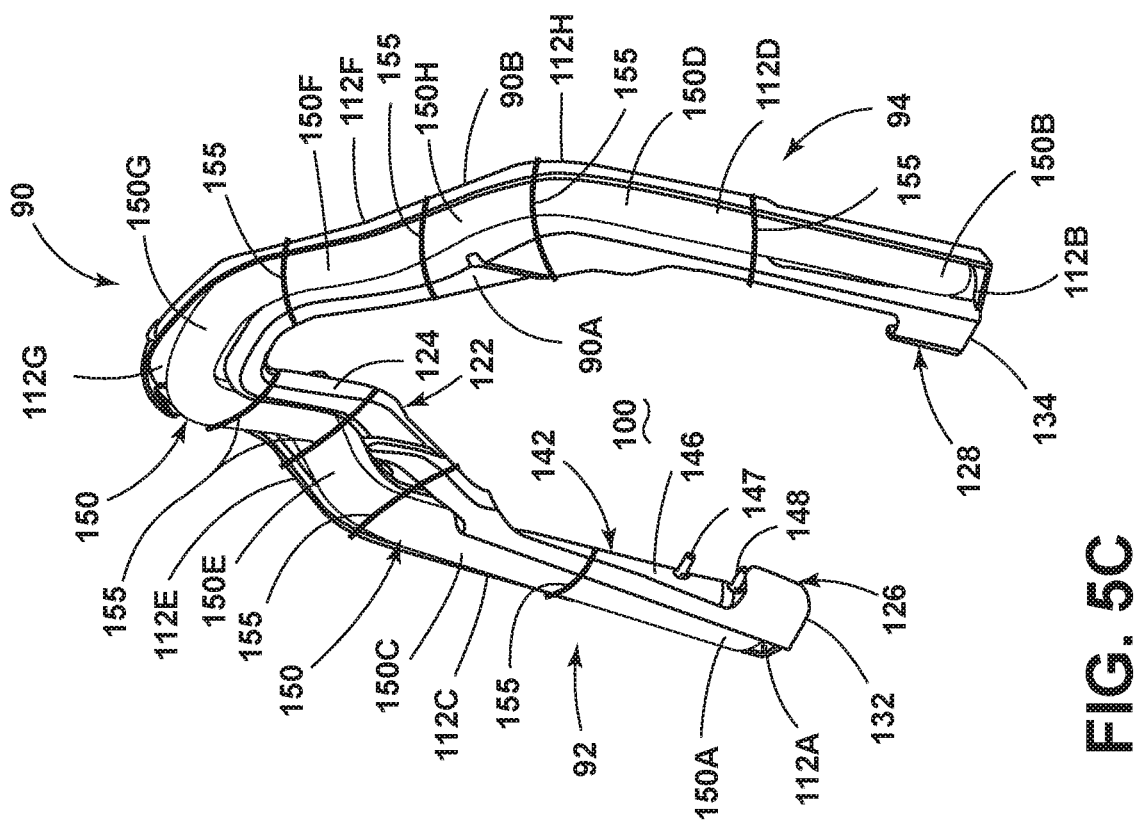
FIG. 5C is a front perspective view of the seatback carrier module of FIG. 5B.
Figure 5B:
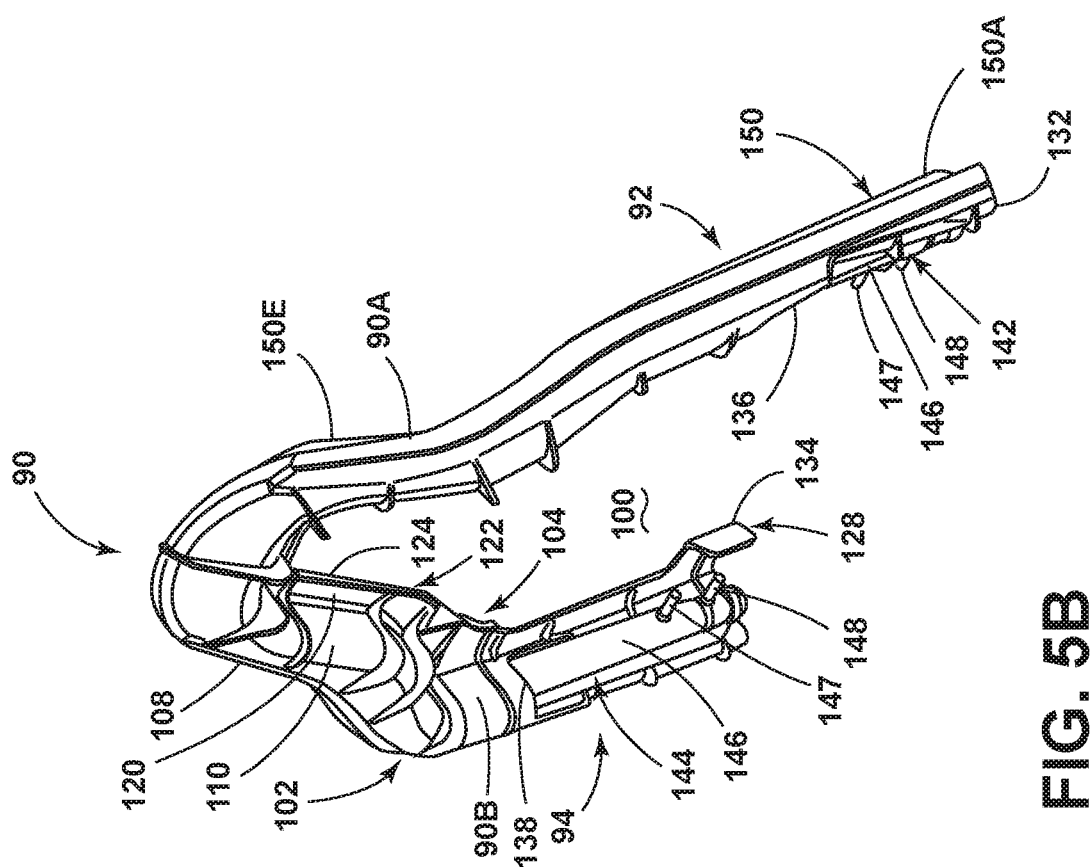
FIG. 5B is a rear perspective view of the seatback carrier module of FIG. 5A with the airbag assembly and the two inflator mechanisms received on the seatback carrier module.
Figure 5D:
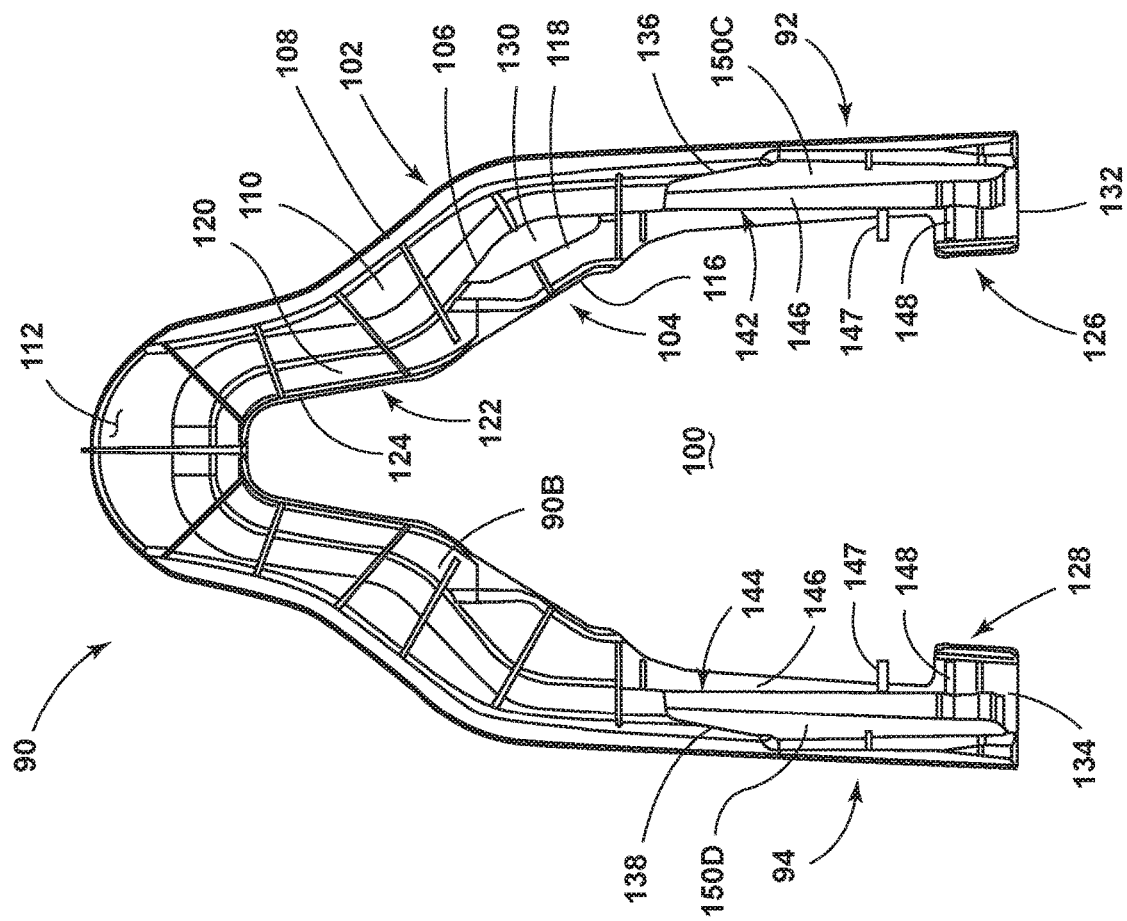
FIG. 5D is a rear elevation view of the seatback carrier module of FIG. 5B.
Figure 5E:
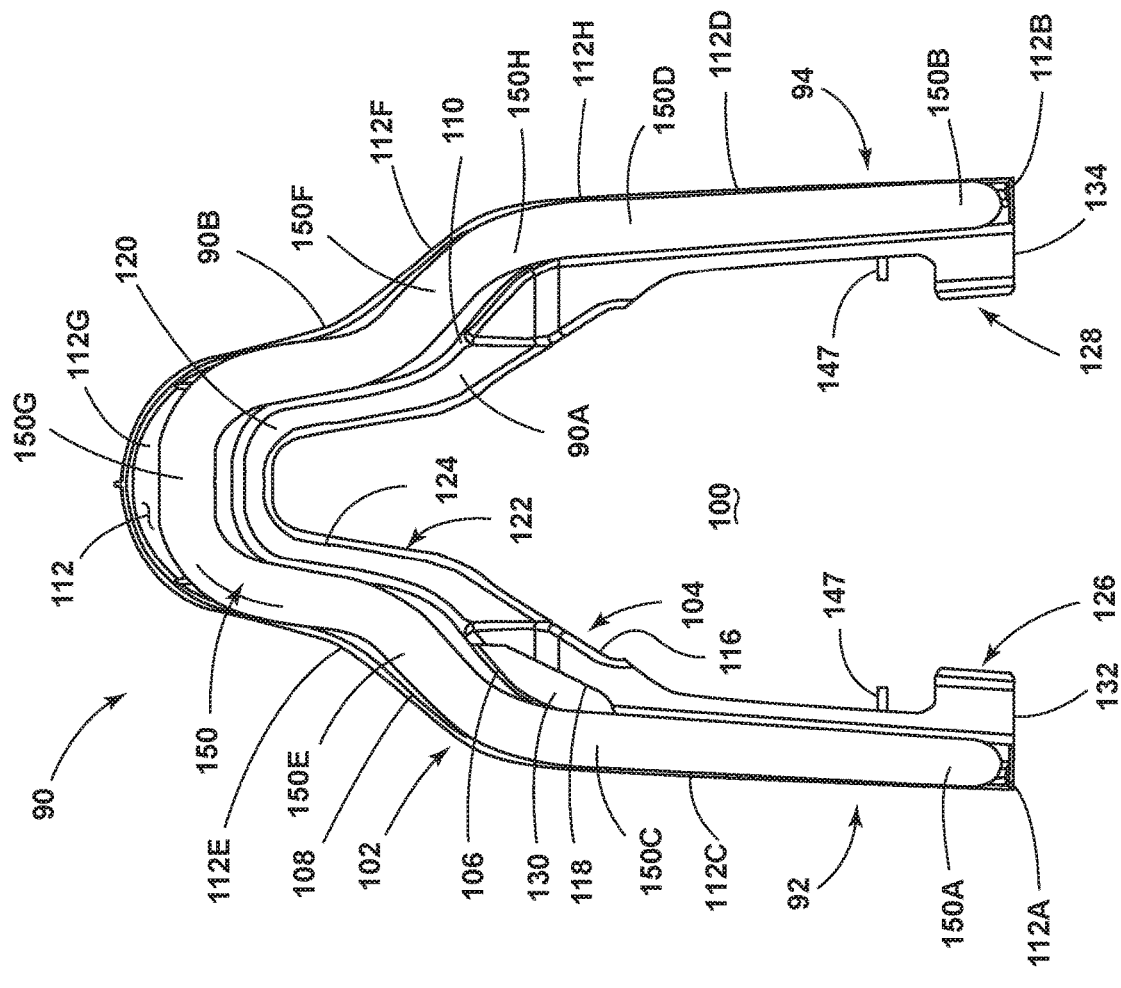
FIG. 5E is a front elevation view of the seatback carrier module of FIG. 5B.

Referring now to FIGS. 5B, 5C and 5E, the airbag assembly 150 is shown received within the cradle portion 102 of the seatback carrier module 90 at the raceway 112 thereof. With specific reference to FIGS. 5C and 5E, the portions 150C, 150D, 150E, 150F, and 150G of the body portion 150H of the airbag assembly 150 are shown aligned with the portions 112C, 112D, 112E, 112F, and 112G of the body portion 112H of the raceway 112. As further shown in FIG. 5C, the first and second ends 150A, 150B of the airbag assembly 150 are shown received in the raceway 112 at the first and second ends 112A, 112B of the raceway 112. In this way, the airbag assembly 150 shown in the embodiment of FIGS. 5A-5E extends along an entire length of the raceway 112 between the first and second ends 112A, 112B. It is contemplated that the airbag assembly 150 may be disposed partially along the length of the raceway 112, however, the airbag assembly 150 of the present concept is provided to surround the entire seatback assembly 18 at an outer portion thereof, such that the airbag assembly 150 is an overhead airbag assembly that surrounds the arms, torso and head of a seat occupant as seated within the seat assembly 10 (FIGS. 1 and 2). This surround configuration of the airbag assembly 150 relative to a seat occupant is further illustrated in FIGS. 11A and 11B described below.

Referring now to FIGS. 5B-5D, the first and second inflator mechanisms 142, 144 are shown received within the raceway 112 adjacent the access slots 136, 138 respectively. With specific reference to FIG. 5D, the second inflator mechanism 144 is shown disposed adjacent to access slot 138 of the raceway 112 of the second side member 94 of the seatback carrier module 90, such that the body portion 146 of the second inflator mechanism 144 is exposed or accessible through the access slot 138. The upper and lower mounting stems 147, 148 of the second inflator mechanism 144 are shown extending inwardly from the body portion 146 of the second inflator mechanism 144 towards the centrally disposed window 100 defined by the seatback carrier module 90 through the access slot 138. Similarly, the first inflator mechanism 142 is shown disposed adjacent to access slot 136 of the raceway 112 of the first side member 92 of the seatback carrier module 90, such that the body portion 146 of the first inflator mechanism 142 is exposed or accessible through the access slot 136. The upper and lower mounting stems 147, 148 of the first inflator mechanism 142 are shown extending inwardly from the body portion 146 of the first inflator mechanism 142 towards the centrally disposed window 100 defined by the seatback carrier module 90 through the access slot 136. As noted above, the upper and lower mounting stems 147, 148 are used to couple the first and second inflator mechanisms 142, 144 to the first and second side members 32, 34, respectively, of the seatback frame 30, such that the first and second inflator mechanisms 142, 144 are securely mounted within the seatback assembly 18 in assembly. As specifically shown in FIG. 5D, the lower mounting stems 148 of the first and second inflator mechanisms 142, 144 are disposed adjacent to the lower engagement members 126, 128, respectively, of the seatback carrier module 90. As further shown in FIG. 5D, the first and second inflator mechanisms 142, 144 are shown disposed adjacent to the upwardly extending portions 150C, 150D of the airbag assembly 150, respectively. It is contemplated that the first and second inflator mechanisms 142, 144 are operably coupled to the airbag assembly 150 at the upwardly extending portions 150C, 150D or at the first and second ends 150A, 150B (FIG. 5A) to provide a burst of air to the airbag assembly 150 for outward forward deployment of the airbag assembly 150 from the cradle portion 102 of the seatback carrier module 90.

The seatback carrier module 90 is contemplated to be a modular component which can be assembled with the airbag assembly 150 received in the raceway 112 of the cradle portion 102 of the seatback carrier module 90 in a preassembled manner. Thus, the seatback carrier module 90 and airbag assembly 150 can be preassembled and shipped to another destination for connecting the seatback carrier module 90 with the seatback frame 30. With specific reference to FIG. 5C, a plurality of securing straps 155 are shown retaining the airbag assembly 150 in the raceway 112 of the seatback carrier module 90. In this way the seatback carrier module 90 can be transported to another location with the airbag assembly 150 securely retained within the raceway 112 of the cradle portion 102 of the seatback carrier module 90. In assembly, it is contemplated that a front carrier module of the seat assembly 10 will retain the airbag assembly 150 within the raceway 112 as coupled to the front portion 98 of the seatback carrier module 90, such that the securing straps 155 may be removed during the full assembly of the seat assembly 10.

Figure 6:
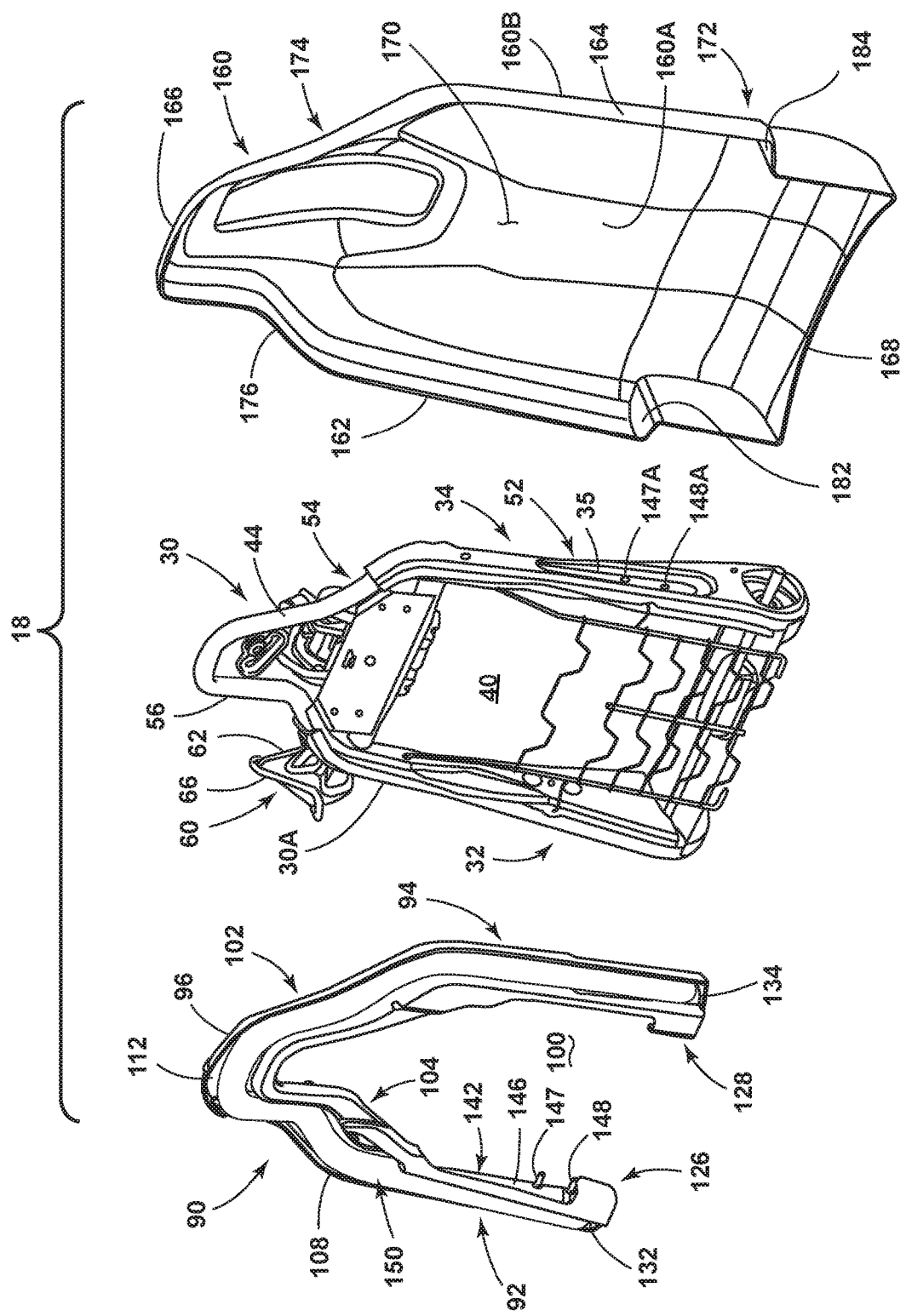
FIG. 6 is an exploded view of a seatback assembly.
Figure 7A:
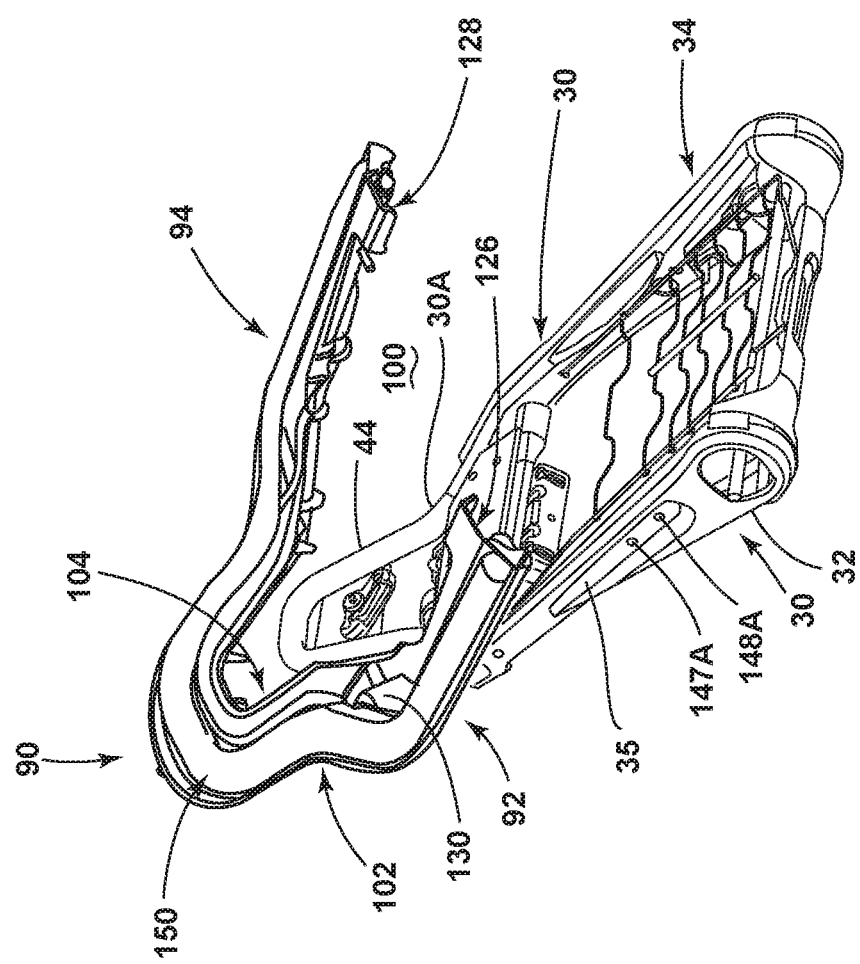

Referring now to FIG. 6, the seatback assembly 18 is shown in an exploded view with the seatback carrier module 90 exploded away from the seatback frame 30 which is further exploded away from a back panel 60. As outlined in FIG. 6, the upper cross member 96 and the first and second side members 92, 94 of the seatback carrier module 90 are configured to be disposed outwardly adjacent to the upper frame member 44 and the first and second side members 32, 34, respectively, of the seatback frame 30 when the mounting portion 104 of the seatback carrier module 90 is mounted to the front side 30A of the seatback frame 30. In this way, the cradle portion 102 of the seatback carrier module 90 will be disposed outwardly adjacent to the outer perimeter 56 of the seatback frame 30 to substantially surround the seatback frame 30 in assembly. In FIG. 6, the inset portion 35 of the second side member 34 of the seatback frame 30 is shown having upper and lower mounting apertures 147A, 148A. As noted above, the first and second side members 32, 34 of the seatback frame 30 are complementary members having similar configurations. Thus, it is contemplated that the first side member 32 also includes an inset portion having upper and lower mounting apertures, as shown in FIG. 7A. It is contemplated that the inset portion 35 of the second side member 34 of the seatback frame 30 is configured to at least partially receive a portion of the body portion 146 of the second inflator mechanism 144, such that the upper and lower mounting stems 147, 148 of the second inflator mechanism 144 can be received through the upper and lower mounting apertures 147A, 148A of the inset portion 35 of the second side member 34 of the seatback frame 30 to securely mount the second inflator mechanism 144 to the seatback frame 30. It is also contemplated that the first inflator mechanism 142 is similarly mounted to the first side member 32 of the seatback frame 30.

Figure 8:
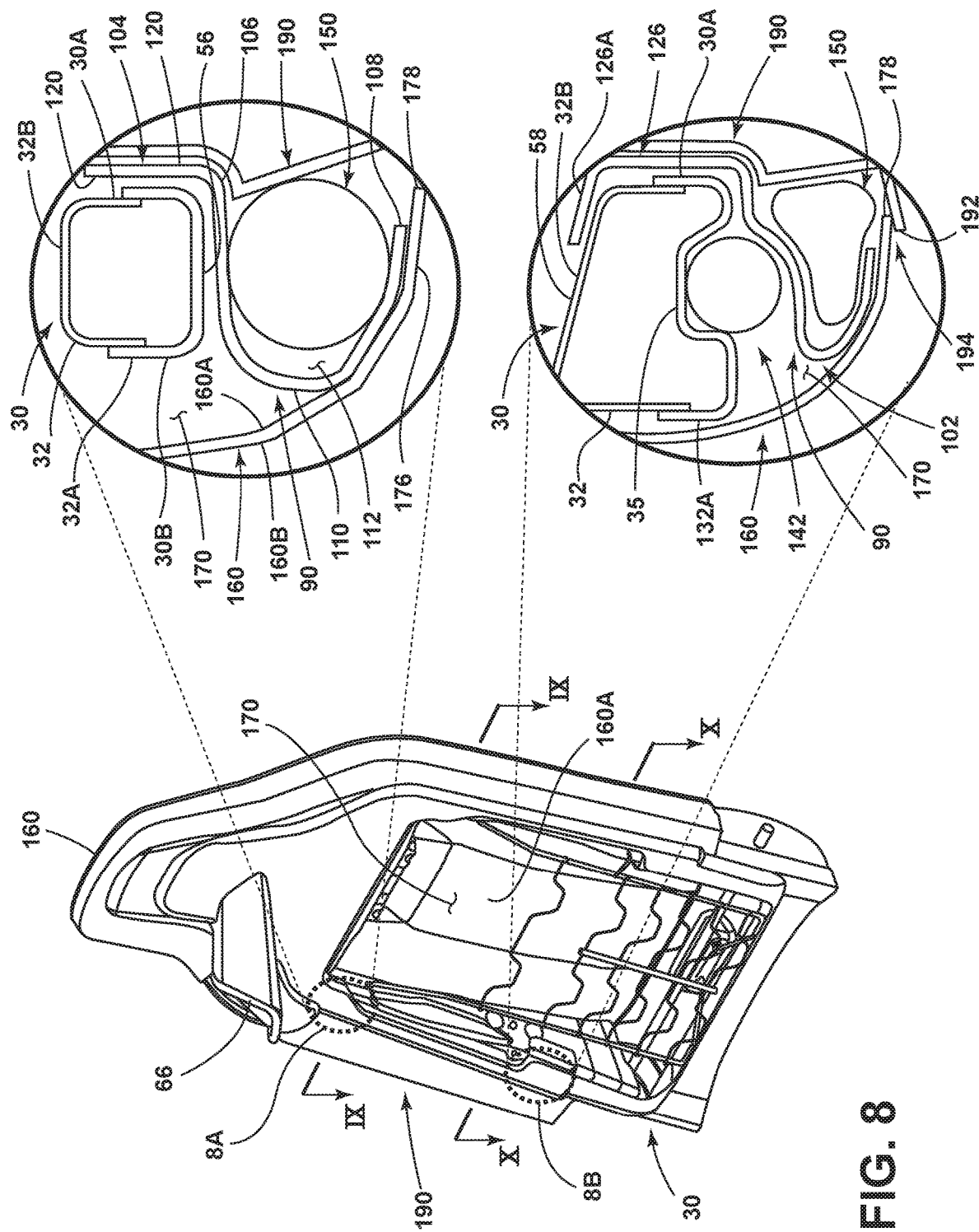
FIG. 8 is a front perspective view of a seatback assembly showing zoomed in portions at locations 8A and 8B.

As further shown in FIG. 6, the back panel 160 is contemplated to be a closure panel for enclosing the seatback frame 30 and seatback carrier module 90 to a front carrier assembly 190 (FIGS. 8-10). The back panel 160 includes a front side 160A and a rear side 160B. The back panel 160 includes first and second sides 162, 164 which are interconnected by an upper portion 166 and a lower portion 168 to define a cavity 170 therebetween. The cavity 170 includes a back support portion 172 and a headrest support portion 174 which is disposed above the back support portion 172. In assembly, the headrest support portion 54 of the seatback frame 30 is received in the headrest support portion 174 of the back panel 160. Similarly, the back support portion 52 of the seatback frame 30 is received in the back support portion 172 of the back panel 160 in assembly. The back panel 160 includes an outer perimeter 176 that is configured to surround the outer edge 108 of the cradle portion 102 of the seatback carrier module 90. The back panel 160 further includes a front edge 178 that is used to couple the back panel 160 to a front carrier module around the frame assembly 30. The back panel 160 further includes first and second landings 182, 184 disposed near lower portions of the first and second sides 162, 164. The first and second landings 182, 184 inwardly extend from the first and second sides 162, 164, respectively, to provide a substantially horizontal surface for supporting the seatback carrier module 90. Specifically, in assembly, the first and second landings 182, 184 are configured to support the first and second ends 132, 134 of the seatback carrier module 90, respectively, in an abutting relationship.

With reference to FIGS. 7A-7C, the seatback carrier module 90 is shown being mounted to the seatback frame 30. With specific reference to FIG. 7A, the seatback carrier module 90 must pivot and orientate itself around the mounting bracket 62 (FIG. 6) of the seat belt retainer 60 in order to mount to the front side 30A of the seatback frame 30. As such, the access aperture 130 positioned between the mounting portion 104 and the cradle portion 102 of the seatback carrier module 90 must be aligned with the mounting bracket 62 of the seat belt retainer 60 to allow the mounting bracket 62 of the seatbelt retainer 60 to extend through the access aperture 130 of the seatback module 90 for properly positioning the mounting portion 104 of the seatback carrier module 90 to the front side 30A of the seatback frame 30. Thus, the seatback carrier module 90 must approach the seatback frame 30 at an angle to allow for the retaining bar 66 and mounting plate 62 of the seatbelt retainer 60 to pass through the access aperture 130 disposed on the first side member 92 of the seatback carrier module 90 in a manner as shown in FIG. 7B. As further shown in FIG. 7A, the inset portion 35 of first side member 32 of the seatback frame 30 is shown having upper and lower mounting apertures 147A, 148A for receiving the upper and lower mounting stems 147, 148 of the first inflator mechanism 142 in assembly.

Once the seatbelt retainer 60 has passed through the access aperture 130 of the seatback carrier module 90, the second side member 94 of the seatback carrier module 90 must be maneuvered around and coupled to the second side member 34 of the seatback frame 30 as shown in FIG. 7C. Thus, as fully mounted together, as shown in FIG. 7C, the seatback frame 30 is received within the centrally disposed window 100 defined by the seatback carrier module 90. Specifically, the mounting portion 104 of the seatback carrier module 90 is mounted to the front side 30A of the seatback frame 30. As shown in FIG. 7C, the body portion 120 and rearwardly extending sidewall 124 of the mounting portion 104 are wrapped around the upper frame member 44 of the seatback frame 30. As further shown in FIG. 7C, the lower engagement members 126, 128 are coupled to the front side 30A of the seatback frame 30 at lower portions of the first and second side members 32, 34 of the seatback frame 30. In this way, the first and second side members 92, 94 of the seatback carrier module 90 are coupled to the first and second side members 32, 34 of the seatback frame 30. It is contemplated in FIG. 7C that the upper and lower mounting stems 147, 148 of the first and second inflator mechanisms 142, 144 are received in the upper and lower mounting apertures 147A, 148A of the respective first and second side members 32, 34 of the seatback frame 30. As coupled to the seatback frame 30, the seatback carrier module 90 provides a cradle portion 104 having a raceway 112 that surrounds an outer perimeter 56 (FIG. 6) of the seatback frame 30 for receiving an airbag assembly 150 therein. In this way, the airbag assembly 150 surrounds the outer perimeter 56 of the seatback frame 30 for forward deployment around a seat occupant.

Referring now to FIG. 8, a front carrier module 190 is shown coupled to the back panel 160 around the seatback frame 30 and the seatback carrier module 90. A central cushion member of the front carrier module 190 has been removed to reveal the cavity 170 of the back panel 160 and the front side 160A thereof. At the zoomed in location identified as location 8A in FIG. 8, the seatback carrier module 90 is shown mounted to the seatback frame 30. Specifically, the body portion 120 of the mounting portion 104 of the seatback carrier module 90 is mounted to the front side 30A of the seatback frame 30. The cradle portion 102 of the seatback carrier module 90 is shown disposed outboard of the outer perimeter 56 of the seatback frame 30. The cradle portion 102 is shown having inner and outer edges 106, 108 with the rearwardly extending body portion 110 disposed therebetween in a curved manner to define the raceway 112 in which the airbag assembly 150 is disposed.

At the zoomed in location identified as location 8B in FIG. 8, the seatback carrier module 90 is shown mounted to the seatback frame 30. Specifically, the lower engagement member 26 of the mounting portion 104 of the seatback carrier module 90 is mounted to the front side 30A of the seatback frame 30 with the rearwardly extending sidewall 126A wrapped around the front side 30A of the seatback frame 30 and disposed along the inner edge 58 of the seatback frame 30. The cradle portion 102 of the seatback carrier module 90 is shown disposed outboard of the outer perimeter 56 of the seatback frame 30, and the first inflator mechanism 142 is shown disposed in the inset portion 35 of the first side member 32 of the seatback frame 30. As further shown at the zoomed in location identified as location 8B in FIG. 8, the front edge 178 of the back panel 160 is operably coupled to a rear edge 192 of the front carrier module 190 to form a joint 194 therebetween. It is contemplated that the airbag assembly 150 will separate the front carrier module 190 and the back panel 170 at the joint 194 to deploy in a forward direction around a seat occupant in a manner as shown in FIGS. 11A and 11B.

Referring now to FIG. 9, the airbag assembly 150 is shown disposed within the raceway 112 of the seatback carrier module 90. In the embodiment shown in FIG. 9, the airbag assembly 150 includes a strap 200 which outwardly extends from the body portion 150H of the airbag assembly 150 at a first end 202 of the strap 200. The strap 200 further includes a second end 204 which is operably coupled to the inner edge 58 of the seatback frame 30, such that the strap 200 wraps around the rear side 30B of the seatback frame 30. The strap 200 extends from the raceway 112 to the seatback frame 30 through a slot 113 disposed through the body portion 110 of the cradle portion 102. In FIG. 9, straps 200 are shown coupled to the first and second side member 32, 34 of the seatback frame 30. It is further contemplated that the airbag assembly 150 may include a plurality of straps for mounting the airbag assembly 150 to the seatback frame 30. As such, it is contemplated that the straps 200 of the plurality of straps of the of the airbag assembly 150 may be evenly spaced-apart along portions of the body portion 150H of the airbag assembly 150 for securely mounting the airbag assembly 150 to the seatback frame 30. Such a configuration of mounting the airbag assembly 150 to the seatback frame 30 provides for a reinforcing configuration against a seat occupant whom can impart a forwardly directed force on the airbag assembly 150 after the airbag assembly 150 has been deployed. The straps 200 help to redirect such forces.

Referring now to FIG. 10, the airbag assembly 150 is shown disposed within the raceway 112 of the seatback carrier module 90 along the side members 32 and 34 of the seatback frame 30. The lower engagement members 126, 128 of the mounting portion 104 of the seatback carrier module 90 are shown having respective rearwardly extending sidewalls 126A, 128A wrapped around the inner edge 58 of the seatback frame 30 to securely couple the seatback carrier module thereto.

Figure 11A:
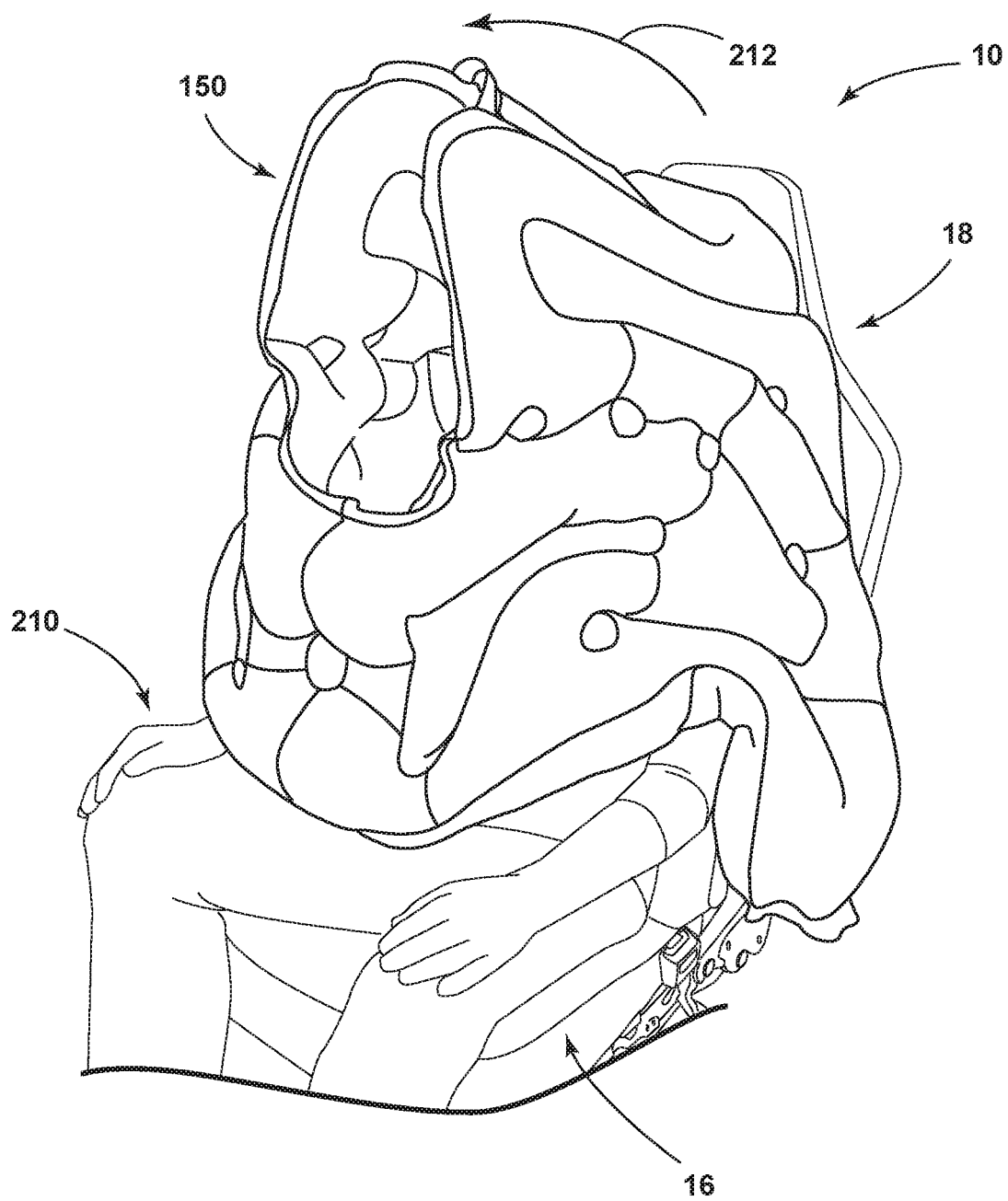
FIG. 11A is a front perspective view of a passenger seated in the seat assembly of FIG. 2 with an overhead airbag shown in a deployed position.
Figure 11B:
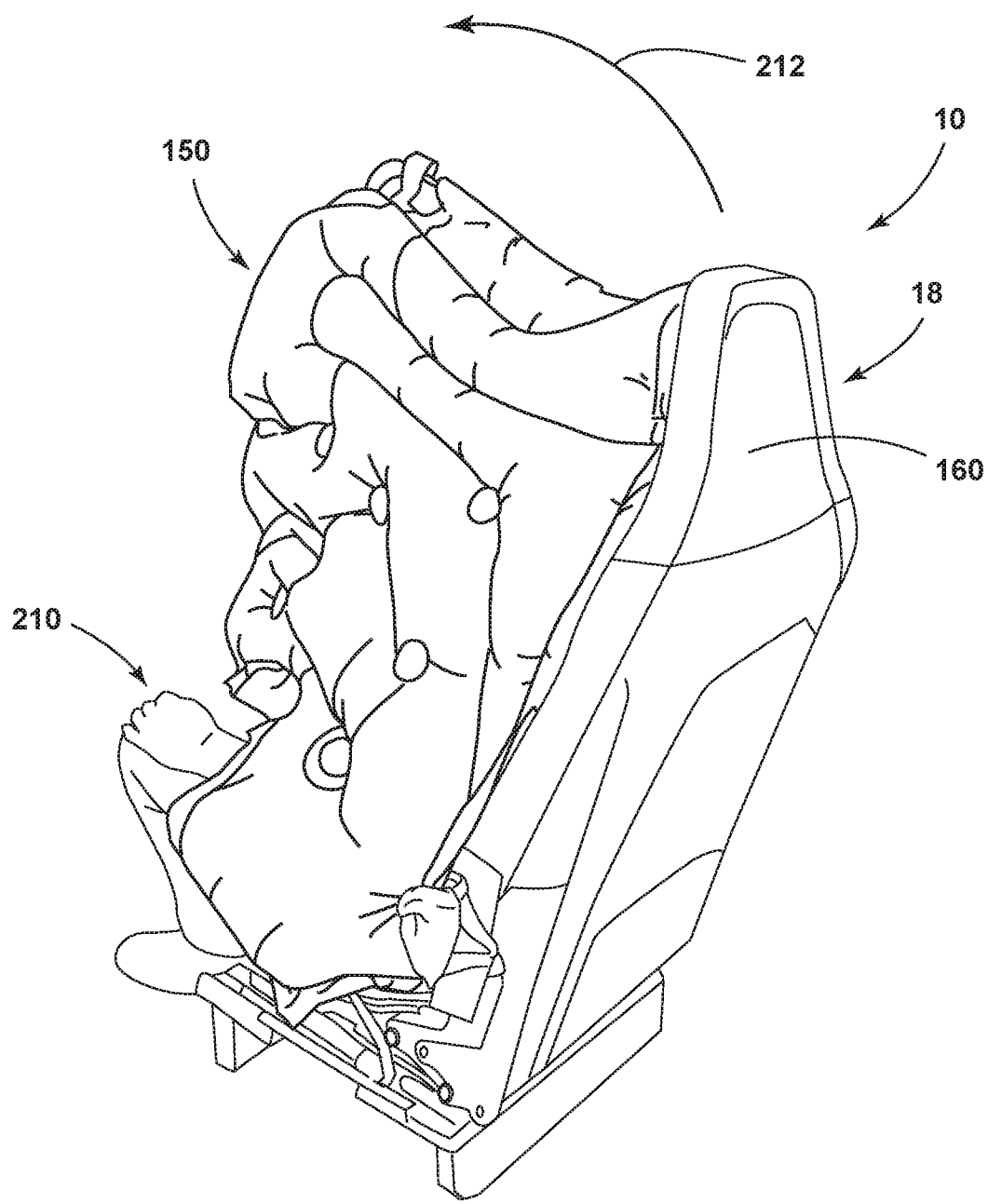
FIG. 11B is a rear perspective view of the seat assembly and passenger of FIG. 11A.

Referring now to FIGS. 11A and 11B, a seat occupant 210 is shown seated on the seat assembly 10. In FIGS. 11A and 11B, the airbag assembly 150 is shown in the deployed position. With the airbag assembly 150 being and overhead airbag assembly disposed around the seatback assembly 18, the airbag assembly 150 is configured to deploy outwardly along the path as indicated by arrow 212 to surround the seat occupant 210 as shown in FIGS. 11A and 11B.

According to one aspect of the present invention, a seatback carrier module includes first and second side portions spaced-apart from one another and interconnected by an upper portion. A cradle portion is disposed along the first and second side portions and the upper portion of the seatback carrier module. The cradle portion includes inner and outer edges with a rearwardly extending body portion. A mounting portion is disposed along a portion of the inner edge of the cradle portion. The mounting portion includes inner and outer edges with a body portion disposed therebetween. The mounting portion further includes a rearwardly extending sidewall disposed along the inner edge of the mounting portion. An airbag assembly is received within the cradle portion.

Embodiments of the first aspect of the invention can include any one or a combination of the following features:
- the body portion of the cradle portion defines a raceway having first and second ends with a body portion disposed therebetween;
- the body portion of the raceway includes first and second upwardly extending portions which respectively extend upwardly from the first and second ends of the body portion of the raceway along the first and second side portions;
- the body portion of the raceway further includes an upper transverse portion which interconnects the first and second upwardly extending portions of the body portion of the raceway;
- the body portion of the raceway includes an inverted U-shaped configuration;
- the airbag assembly is an elongate airbag assembly having first and second ends with a body portion disposed therebetween, and further wherein the first and second ends of the airbag assembly are received in the first and second ends of the raceway; and
- the body portion of the airbag assembly is substantially received along an entirety of the body portion of the raceway.

According to another aspect of the present invention, a seatback carrier module includes a mounting portion having inner and outer edges with a body portion disposed therebetween. The mounting portion further includes a rearwardly extending sidewall disposed along the inner edge of the mounting portion. A cradle portion is disposed along and surrounds the outer edge of the mounting portion. The cradle portion includes an outwardly opening raceway having first and second ends with an upwardly curved body portion disposed between the first and second ends. An airbag assembly is received within the outwardly opening raceway of the cradle portion for outward deployment therefrom.

Embodiments of the second aspect of the invention can include any one or a combination of the following features:
- the airbag assembly is an elongate airbag assembly having first and second ends with a body portion disposed therebetween;
- the first and second ends of the airbag assembly are received in the first and second ends of the outwardly opening raceway;
- the body portion of the airbag assembly is substantially received along an entirety of the body portion of the outwardly opening raceway;
- the outwardly opening raceway is defined between inner and outer edges of the cradle portion and a rearwardly extending portion interconnecting the inner and outer edges of the cradle portion;
- inwardly opening opposed first and second access slots disposed through the rearwardly extending portion of the outwardly opening raceway; and
- at least one inflator mechanism operably coupled to the airbag assembly and disposed adjacent to one of the first access slot and the second access slot and accessible therethrough.

According to yet another aspect of the present invention, a seatback assembly includes a seatback frame having first and second side members defining a back support portion of the seatback frame. An upper frame member interconnects the first and second side members of the seatback frame to define a headrest support portion of the seatback frame. The upper frame member extends upwardly from the back support portion of the seatback frame. The seatback frame includes an outer perimeter disposed around the first and second side members and the upper frame member. A seatback carrier module is operably coupled to the seatback frame and includes a cradle portion outwardly extending from the outer perimeter of the seatback frame. An airbag assembly is supported by the seatback carrier module. The airbag assembly is disposed on opposed sides of the back support portion of the seatback frame and is further disposed over the headrest support portion of the seatback frame.

Embodiments of the third aspect of the invention can include any one or a combination of the following features:
- the cradle portion includes an inner edge and an outer edge with a rearwardly extending body portion disposed therebetween to define a raceway;
- the airbag assembly is received in the raceway of the seatback carrier module around the outer perimeter of the seatback frame;
- the seatback carrier module includes a mounting portion inwardly disposed along a portion of the inner edge of the cradle portion, and further wherein the mounting portion is operably coupled to the seatback frame; and
- the seatback carrier module includes an access aperture disposed between the cradle portion and the mounting portion.
- the seatback frame includes a mounting bracket outwardly extending from one of the first and second side members, and further wherein the mounting bracket is received through the access aperture of the seatback carrier module when the seatback carrier module is coupled to the seatback frame.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A seatback carrier module, comprising:
first and second side portions spaced-apart from one another and interconnected by an upper portion;
a cradle portion disposed along the first and second side portions and the upper portion, the cradle portion having inner and outer edges with a rearwardly extending body portion disposed therebetween;

a mounting portion disposed along a portion of the inner edge of the cradle portion, wherein the mounting portion includes inner and outer edges with a body portion disposed therebetween, wherein the mounting portion further includes a rearwardly extending sidewall disposed along the inner edge of the mounting portion; and an airbag assembly received within the cradle portion.

2. The seatback carrier module of claim 1, wherein the body portion of the cradle portion defines a raceway having first and second ends with a body portion disposed therebetween.

3. The seatback carrier module of claim 2, wherein the body portion of the raceway includes first and second upwardly extending portions which respectively extend upwardly from the first and second ends of the body portion of the raceway along the first and second side portions.

4. The seatback carrier module of claim 3, wherein the body portion of the raceway further includes an upper transverse portion which interconnects the first and second upwardly extending portions of the body portion of the raceway.

5. The seatback carrier module of claim 4, wherein the body portion of the raceway includes an inverted U-shaped configuration.

6. The seatback carrier module of claim 5, wherein the airbag assembly is an elongate airbag assembly having first and second ends with a body portion disposed therebetween, and further wherein the first and second ends of the airbag assembly are received in the first and second ends of the raceway.

7. The seatback carrier module of claim 6, wherein the body portion of the airbag assembly is substantially received along an entirety of the body portion of the raceway.

8. A seatback carrier module, comprising:

a mounting portion having inner and outer edges with a body portion disposed therebetween, wherein the mounting portion further includes a rearwardly extending sidewall disposed along the inner edge of the mounting portion;

a cradle portion disposed along and surrounding the outer edge of the mounting portion, wherein the cradle portion includes an outwardly opening raceway having first and second ends with an upwardly curved body portion disposed between the first and second ends of the outwardly opening raceway; and an airbag assembly received within the outwardly opening raceway of the cradle portion for outward deployment therefrom.

9. The seatback carrier module of claim 8, wherein the airbag assembly is an elongate airbag assembly having first and second ends with a body portion disposed therebetween.

10. The seatback carrier module of claim 9, wherein the first and second ends of the airbag assembly are received in the first and second ends of the outwardly opening raceway.

11. The seatback carrier module of claim 10, wherein the body portion of the airbag assembly is substantially received along an entirety of the body portion of the outwardly opening raceway.

12. The seatback carrier module of claim 8, wherein the outwardly opening raceway is defined between inner and outer edges of the cradle portion and a rearwardly extending body portion interconnecting the inner and outer edges of the cradle portion.

13. The seatback carrier module of claim 12, including:

inwardly opening opposed first and second access slots disposed through the rearwardly extending body portion of the outwardly opening raceway.

14. The seatback carrier module of claim 13, including:

at least one inflator mechanism operably coupled to the airbag assembly and disposed adjacent to one of the first access slot and the second access slot and accessible therethrough.

15. A seatback assembly, comprising:

a seatback frame having first and second side members defining a back support portion of the seatback frame, and an upper frame member interconnecting the first and second side members of the seatback frame to define a headrest support portion of the seatback frame, wherein the upper frame member extends upwardly from the back support portion of the seatback frame, and further wherein the seatback frame includes an outer perimeter disposed around the first and second side members and the upper frame member;

a seatback carrier module operably coupled to the seatback frame and having a cradle portion outwardly extending from the outer perimeter of the seatback frame; and an airbag assembly supported by the seatback carrier module, wherein the airbag assembly is disposed on opposed sides of the back support portion of the seatback frame and is further disposed over the headrest support portion of the seatback frame.

16. The seatback assembly of claim 15, wherein the cradle portion includes an inner edge and an outer edge with a rearwardly extending body portion disposed therebetween to define a raceway.

17. The seatback assembly of claim 16, wherein the airbag assembly is received in the raceway of the seatback carrier module around the outer perimeter of the seatback frame.

18. The seatback assembly of claim 16, wherein the seatback carrier module includes a mounting portion inwardly disposed along a portion of the inner edge of the cradle portion, and further wherein the mounting portion is operably coupled to the seatback frame.

19. The seatback assembly of claim 18, wherein the seatback carrier module includes an access aperture disposed between the cradle portion and the mounting portion.

20. The seatback assembly of claim 19, wherein the seatback frame includes a mounting bracket outwardly extending from one of the first and second side members, and further wherein the mounting bracket is received through the access aperture of the seatback carrier module when the seatback carrier module is coupled to the seatback frame.

* * * * *